US012771511B2

(12) United States Patent
Huang et al.

(10) Patent No.: US 12,771,511 B2
(45) Date of Patent: Oct. 20, 2026

(54) DETAILS FOR 8 PORTS SRS MAPPING TO MULTIPLE OFDM SYMBOLS

(71) Applicant: QUALCOMM Incorporated, San Diego, CA (US)

(72) Inventors: Yi Huang, San Diego, CA (US); Yu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 374 days.

(21) Appl. No.: 18/520,038

(22) Filed: Nov. 27, 2023

(65) Prior Publication Data

US 2024/0223338 A1 Jul. 4, 2024

Related U.S. Application Data

(60) Provisional application No. 63/478,480, filed on Jan. 4, 2023.

(51) Int. Cl.
*H04W 72/04* (2023.01)
*H04L 5/00* (2006.01)

(52) U.S. Cl.
CPC .................................. *H04L 5/0053* (2013.01)

(58) Field of Classification Search
CPC ... H04L 5/0053; H04L 5/0094; H04L 5/0048; H04L 5/0023; H04B 7/0456
See application file for complete search history.

(56) References Cited

U.S. PATENT DOCUMENTS

| | | | | |
|---|---|---|---|---|
| 2016/0338050 | A1* | 11/2016 | Kim | H04W 4/70 |
| 2019/0268185 | A1* | 8/2019 | Wang | H04L 27/2613 |
| 2020/0099490 | A1* | 3/2020 | Sridharan | H04L 5/0007 |
| 2020/0374814 | A1* | 11/2020 | Gong | H04L 5/0023 |
| 2021/0083825 | A1* | 3/2021 | Choi | H04L 5/0023 |
| 2022/0353039 | A1* | 11/2022 | Okamura | H04W 52/146 |
| 2024/0187174 | A1* | 6/2024 | Frenne | H04L 5/0048 |
| 2025/0168041 | A1* | 5/2025 | Liu | H04L 25/0226 |
| 2025/0226951 | A1* | 7/2025 | Shibaike | H04L 5/0048 |

(Continued)

FOREIGN PATENT DOCUMENTS

| | | | | |
|---|---|---|---|---|
| EP | 3584982 B1 | 10/2022 | | |
| WO | WO-2024099530 A1 * | 5/2024 | | H04L 5/0048 |

OTHER PUBLICATIONS

3GPP TS 38.214: "3rd Generation Partnership Project, Technical Specification Group Radio Access Network, NR, Physical Layer Procedures for Data (Release 15)", 3rd Generation Partnership Project, Mobile Competence Centre, 650, Route Des Lucioles, F-06921 Sophia-Antipolis Cedex, France, No. V15.4.0, Dec. 2018, Jan. 11, 2019, pp. 1-102, XP051591682, Section 6.

(Continued)

*Primary Examiner* — Mahbubul Bar Chowdhury
(74) *Attorney, Agent, or Firm* — Procopio, Cory, Hargreaves & Savitch LLP

(57) ABSTRACT

A method for wireless communication at a user equipment (UE) and related apparatus are provided. In the method, the UE sequentially maps a first number of Sounding Reference Signal (SRS) ports to a second number of orthogonal frequency-division multiplexing (OFDM) symbols. The first number and the second number are greater than one. The UE further transmits an SRS from the first number of SRS ports over the second number of OFDM symbols based on the mapping.

30 Claims, 17 Drawing Sheets

(56) References Cited

U.S. PATENT DOCUMENTS

| | | | | |
|---|---|---|---|---|
| 2025/0260542 | A1* | 8/2025 | Zhang | H04L 5/0048 |
| 2025/0266962 | A1* | 8/2025 | Huang | H04L 5/0094 |
| 2025/0286679 | A1* | 9/2025 | Kim | H04W 72/0453 |

OTHER PUBLICATIONS

International Search Report and Written Opinion—PCT/US2023/081393—ISA/EPO—Mar. 26, 2024.

Zhu M (CATT)., et al., "On SRS Enhancement in Rel-18", 3GPP TSG RAN WG1 #111, R1-2211171, 3rd Generation Partnership Project, Mobile Competence Centre, 650, Route Des Lucioles, F-06921 Sophia-Antipolis Cedex, France, vol. 3GPP RAN 1, No. Toulouse, FR, Nov. 14, 2022-Nov. 18, 2022, Nov. 7, 2022, 5 Pages, XP052221736, The Whole Document.

* cited by examiner

1200

DETAILS FOR 8 PORTS SRS MAPPING TO MULTIPLE OFDM SYMBOLS

CROSS REFERENCE TO RELATED APPLICATION(S)

This application claims the benefit of and priority to U.S. Provisional Application Ser. No. 63/478,480, entitled "DETAILS FOR 8 PORTS SRS MAPPING TO MULTIPLE OFDM SYMBOLS" and filed on Jan. 4, 2023, which is expressly incorporated by reference herein in its entirety.

TECHNICAL FIELD

The present disclosure relates generally to communication systems, and more particularly, to wireless communication with eight ports sounding reference signal (SRS) mapping to multiple orthogonal frequency division multiplexing (OFDM) symbols.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IOT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus may include memory and at least one processor coupled to the memory. Based at least in part on information stored in the memory, the at least one processor may be configured to sequentially map a first number of Sounding Reference Signal (SRS) ports to a second number of orthogonal frequency-division multiplexing (OFDM) symbols, wherein the first number and the second number each being greater than one; and transmit an SRS from the first number of SRS ports over the second number of OFDM symbols based on the mapping.

In an aspect of the disclosure, a method, a computer-readable medium, and an apparatus are provided for wireless communication at a network entity. The apparatus may include memory and at least one processor coupled to the memory. Based at least in part on information stored in the memory, the at least one processor may be configured to receive an SRS from a first number of SRS ports of a UE and sequentially mapped over a second number of OFDM symbols, wherein the second number is greater than one; and receive a physical uplink shared channel (PUSCH) transmission based on the SRS.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
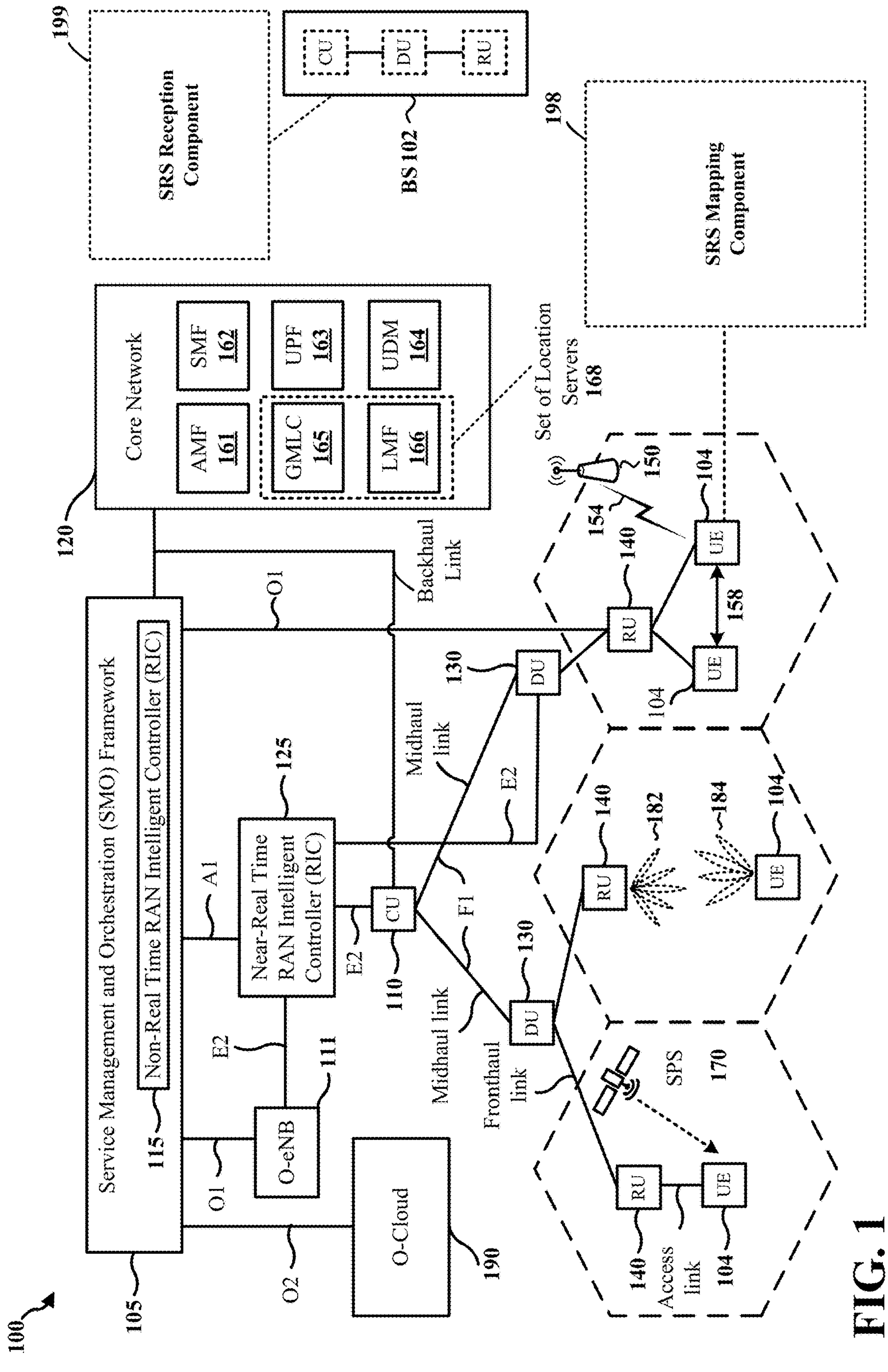
FIG. 1 is a diagram illustrating an example of a wireless communication system and an access network.

In wireless communication, the ability to effectively manage signal transmission and reception across multiple antennas is important for maintaining data throughput and signal reliability in various environments. Example aspects presented herein provide various mapping schemes for mapping different sounding reference signal (SRS) ports to different orthogonal frequency division multiplexing (OFDM) symbols. The proposed mapping schemes enable up to eight uplink (UL) transmission (8 Tx) in the multiple input multiple output (MIMO) environment to support four and more layers (e.g., data streams) per user equipment (UE) in UL for a diverse range of applications including customer premises equipment (CPE), fixed wireless access (FWA), vehicle, and industrial devices.

Various aspects relate generally to wireless communication, and, more particularly, to eight ports SRS mapping to multiple OFDM symbols. Some aspects more specifically relate to a UE sequentially mapping a first number of SRS ports to a second number of OFDM symbols, the first number and the second number each being greater than one; and transmitting an SRS from the first number of SRS ports over the second number of OFDM symbols based on the mapping. In some examples, the first number of SRS ports may be mapped to contiguous or non-contiguous symbols based on one or more of SRS usage, a codebook, or a coherency. In some examples, the first number of SRS ports may be mapped to symbols in the same slot, the same sub-slot, different slots, or different sub-slots based on one or more of SRS usage, a codebook, or a coherency. In some examples, in response to a drop of at least one SRS port of the first number of SRS ports in communication with a network entity, the association of PUSCH with SRS ports may be based on one or more of SRS usage, a codebook, or a coherency.

Particular aspects of the subject matter described in this disclosure can be implemented to realize one or more of the following potential advantages. In some examples, by sequentially mapping a first number of SRS ports to a second number of OFDM symbols, the first number and the second number each being greater than one, the described techniques can be used to enable or enhance 8 Tx UL operation to support four and more layers per UE in UL transmission. Thus, the aspects presented herein improve the efficiency of wireless communication. In some examples, by considering different scenarios like contiguous or non-contiguous symbol mapping, slot or sub-slot boundaries, and different coherence levels of the codebook or precoder when mapping the SRS ports to the OFDM symbols, the described techniques offer greater operational flexibility, especially in dynamic network environments. In some examples, by considering SRS repetitions and potential SRS dropping scenarios, the described techniques ensure continuity and reliability of communication even when partial signal loss occurs. Hence, the described techniques enhance the capabilities and reliability of MIMO systems in wireless communication.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHZ (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHZ-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR2-2 (52.6 GHZ-71 GHZ), FR4 (71 GHz-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include an SRS mapping component 198. The SRS mapping component 198 may be configured to sequentially map a first number of SRS ports to a second number of OFDM symbols. The first number and the second number may each be greater than one. The SRS mapping component 198 may be further configured to transmit an SRS from the first number of SRS ports over the second number of OFDM symbols based on the mapping. In certain aspects, the base station 102 may include an SRS Reception component 199. The SRS Reception component 199 may be configured to receive an SRS from a first number of SRS ports of a UE and sequentially mapped over a second number of OFDM symbols. The second number may be greater than one. The SRS Reception component 199 may be further configured to receive a PUSCH transmission based on the SRS. Although the following description may be focused on 5G NR, the concepts described herein may be applicable to other similar areas, such as LTE, LTE-A, CDMA, GSM, and other wireless technologies.

Figures 2A, 2B, 2C, 2D:
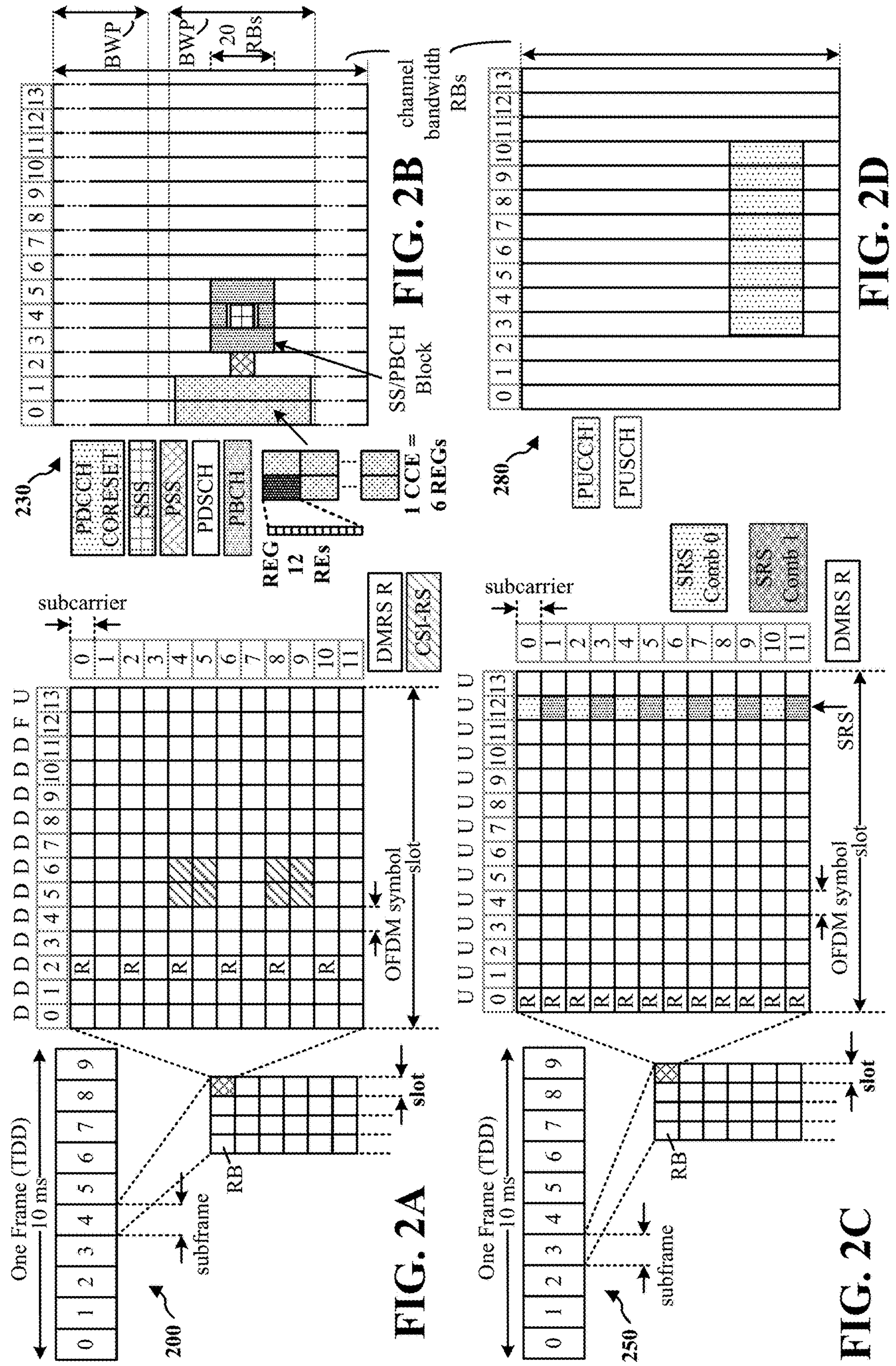
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL. UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and 24 slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
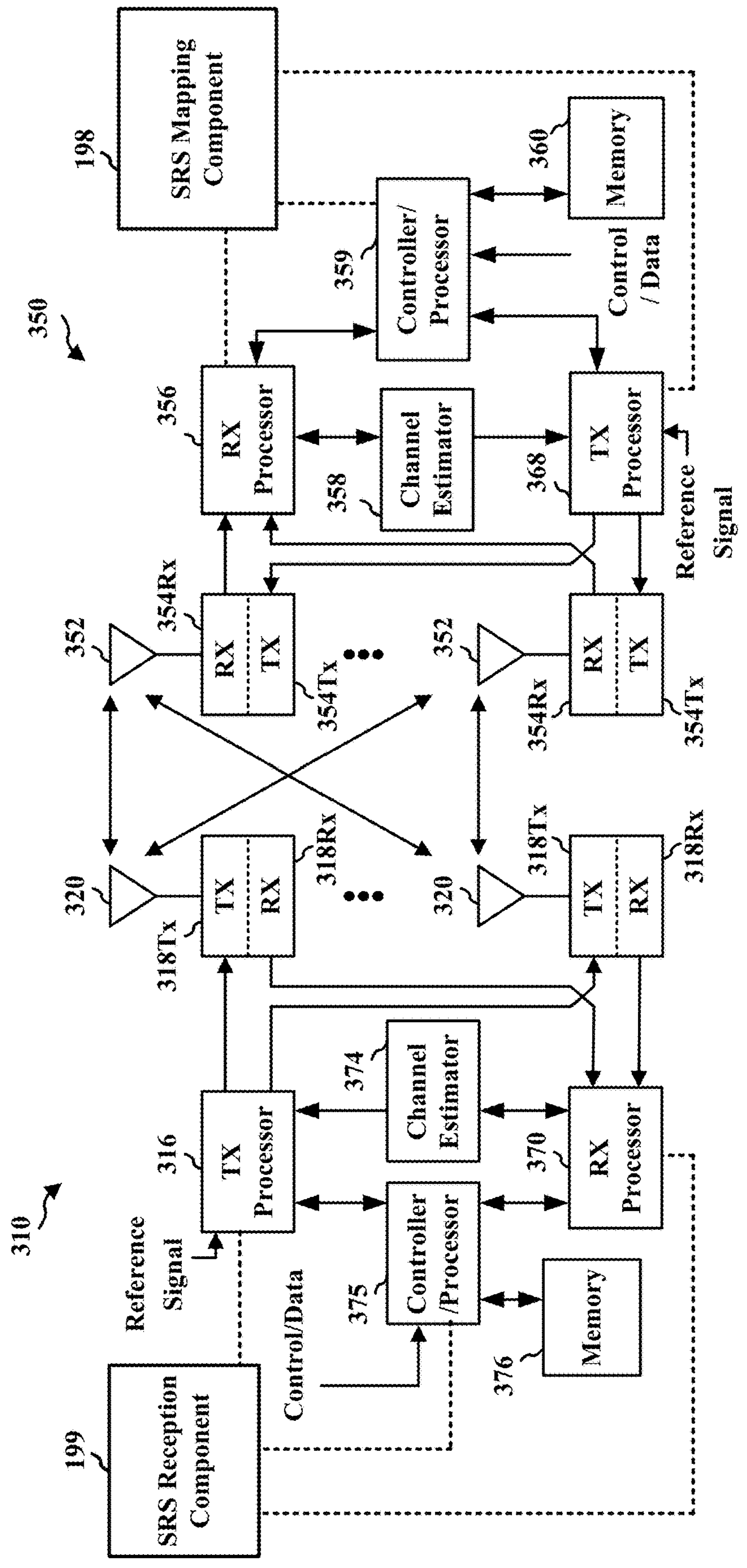
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the SRS mapping component 198 of FIG. 1.

At least one of the TX processor 316, the RX processor 370, and the controller/processor 375 may be configured to perform aspects in connection with the SRS reception component 199 of FIG. 1.

As wireless communication technologies evolve, additional types of UEs may be supported including UEs with multiple antennas. Some UEs may be referred to as "advanced UEs," which may include smartphones, indoor CPE, outdoor CPEs, FWA CPEs, vehicles, industrial devices, laptops, larger-sized devices, etc. Advanced UEs may be associated with higher reliability and/or improved efficiency than non-advanced UEs. Advanced UEs may include multiple antenna elements, including four antennas or more than four antennas, such as eight antenna elements, among other examples. The UEs may support greater than four downlink layers and/or four uplink transmit ports. Advanced UEs may also support DM-RS, sounding reference signal (SRS), and/or codebook designs.

An increased quantity of transmit antennas (Tx) (e.g., greater than four transmit antennas) are being considered for advanced UEs (e.g., mobile devices, larger-sized devices, etc.), and the support of 8-port transmissions (e.g., uplink transmissions, downlink transmissions, or sidelink transmissions) may improve wireless communication performance.

Figure 4:
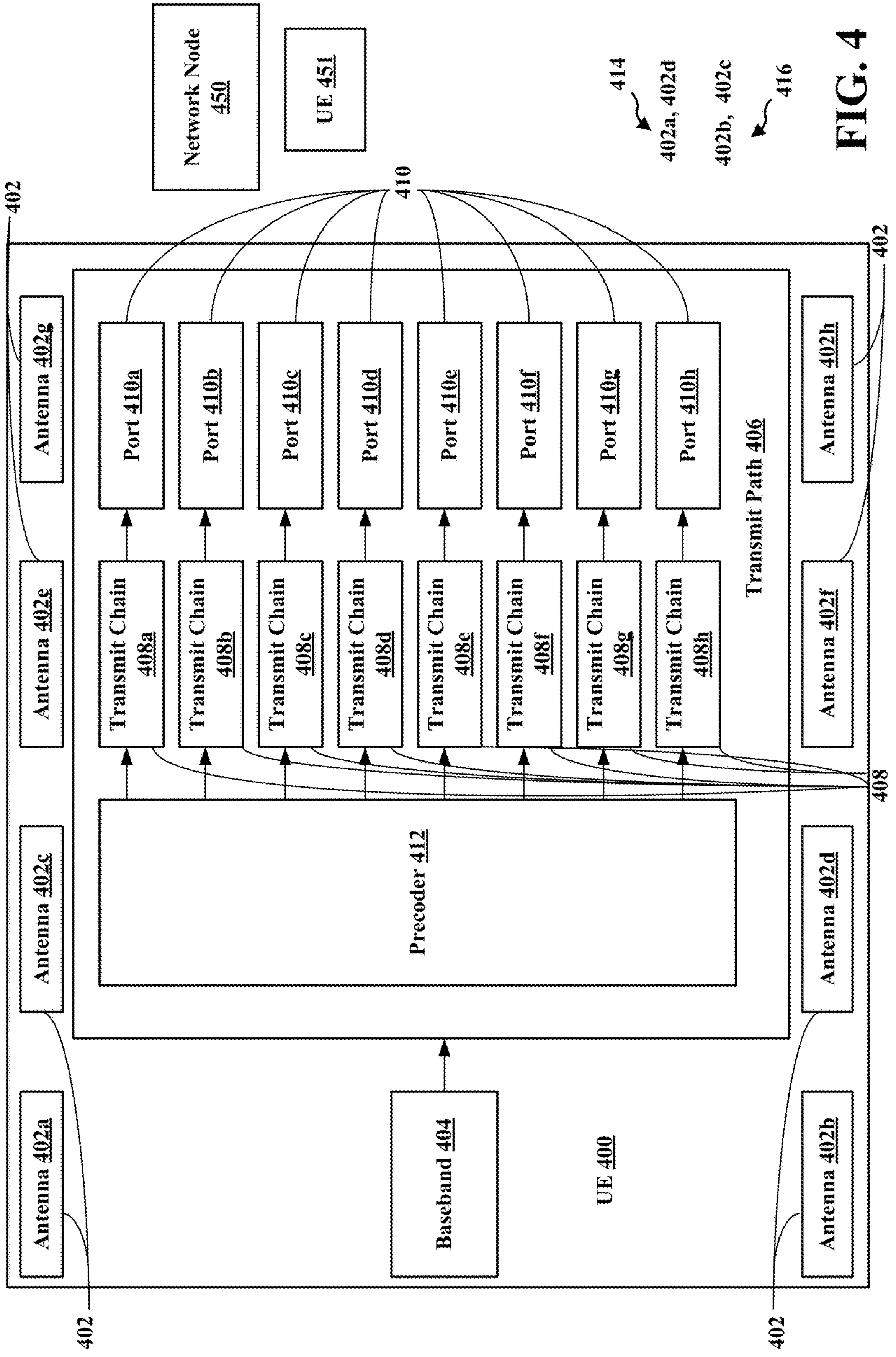
FIG. 4 is a diagram illustrating an example UE in communication with a network entity, in accordance with various aspects of the present disclosure.

FIG. 4 illustrates an example UE 400 in communication (e.g., uplink transmission and downlink reception) with a network node 450, as presented herein. In some aspects, the UE 400 may be in communication with a second UE 451, e.g., using sidelink communication. The UE 400 may be similar to the UE 104 of FIG. 1 and/or the UE 350 of FIG. 3. The network node 450 may be similar to the base station 102, or a component of the base station 102, such as the CU 110, the DU 130, and/or the RU 140 of FIG. 1.

The example UE 400 may include multiple antenna elements. In FIG. 4, the example UE 400 includes eight antenna elements (e.g., a first antenna element 402*a*, a second antenna element 402*b*, a third antenna element 402*c*, a fourth antenna element 402*d*, a fifth antenna element 402*e*, a sixth antenna element 402*f*, a seventh antenna element 402*g*, and an eighth antenna element 402*h*). The antenna elements may be collectively referred to herein as "antenna elements 402." An antenna element may be referred to as an antenna, an antenna port, or a port. Although the example UE 400 is illustrated as having eight antenna elements, in other examples, the UE may include fewer antenna elements or more antenna elements.

In the illustrated example of FIG. 4, the antenna elements 402 are located on different parts of the UE 400, thus creating diversity and providing for directional communication. The UE 400 may use at least one of the antenna elements 402 to transmit communication signals (e.g., SRS signals) to enable the network node 450 to estimate an uplink channel. The UE 400 includes a baseband 404 and a transmit path 406 for uplink transmissions using one or more of the antenna elements 402. Aspects of the baseband 404 may be implemented by the TX processor 368 and/or the processor 359 of the UE 350 of FIG. 3. The transmit path 406 includes eight example transmit chains (e.g., a first transmit chain 408*a*, a second transmit chain 408*b*, a third transmit chain 408*c*, a fourth transmit chain 408*d*, a fifth transmit chain 408*e*, a sixth transmit chain 408*f*, a seventh transmit chain 408*g*, and an eighth transmit chain 408*h*). A transmit chain may also be referred to as an RF chain. The transmit chains of the UE 400 may be collectively referred to "transmit chains 408" herein. Although the example UE 400 is illustrated as having eight transmit chains, in other examples, the UE may include fewer transmit chains or more transmit chains. Each transmit chain may be configured to convert a baseband signal to an RF signal for transmission.

The UE 400 may sound a port by sending an SRS using a combination of transmit chains. In the example of FIG. 4, the UE 400 includes eight example ports 410 (e.g., a first port 410*a*, a second port 410*b*, a third port 410*c*, a fourth port 410*d*, a fifth port 410*c*, a sixth port 410*f*, a seventh port 410*g*, and an eighth port 410*h*). The ports may be collectively referred to herein as "ports 410." Although the example UE 400 is illustrated as having eight ports, in other examples, the UE may include fewer ports or more ports.

The UE 400 may support three levels of coherence: full coherence, partial coherence, and non-coherence. A UE with full coherence may be referred to as a fully-coherent UE and may transmit coherently over all of the antenna elements 402. A fully-coherent UE has the ability to control the relative phase between the transmit chains 408 of the UE 400. Two antenna elements maintain a relative phase if the phases across these two antennas are locked and/or remain the same across uplink transmissions.

A UE with partial coherence may be referred to as a partially-coherent UE and may transmit coherently over pairs of antenna elements. A partially-coherent UE has the ability to maintain a relative phase across multiple subsets of the antenna elements 402. For example, a first coherent antenna pair 414 may include the first antenna element 402*a* and the fourth antenna element 402*d* and a second coherent antenna pair 416 may include the second antenna element 402*b* and the third antenna element 402*c*. The antenna elements of the respective coherent antenna pairs may be coherent antennas relative to each other and may maintain a relative phase across the two respective antenna elements. However, the partially-coherent UE may be unable to maintain phase coherence across these two pairs.

A UE with non-coherence may be referred to as a non-coherent UE and may not be able to transmit coherently over any pairs or sets of antenna elements. For example, a non-coherent UE may lack the ability to maintain a relative phase across any of the antenna elements 402.

In the example of FIG. 4, the UE 400 may support multi-layer uplink transmissions. For a non-coherent UE, each layer of the multi-layer uplink transmission is sent to a single antenna element of the antenna elements 402 and there is no combining across layers. For a partially-coherent UE, certain antenna elements are combined and each layer is sent to multiple ports. A partially-coherent UE may be configured as a partially-coherent 2Tx (PC-2) UE or a partially-coherent 4Tx (PC-4) UE. For a PC-2 UE, each layer of the uplink transmission is sent to two antenna elements of the antenna elements 402, and for a PC-4 UE, each layer of the uplink transmission is sent to four antenna elements of the antenna elements 402. For a fully-coherent UE, each layer is sent to each of the antenna elements 402.

The UE 400 may be configured to apply a precoder 412 across all subbands of an uplink transmission or may be configured to apply a plurality of precoders for a plurality of subbands across the uplink transmission. The network node 450 may configure the UE 400 with one or more precoder configurations. Additionally, or alternatively, the network node 450 may activate a precoder configuration at the UE 400. The UE 400 may receive the precoder configuration via RRC signaling, downlink control information (DCI), and/or a MAC-control element (MAC-CE).

UL DM-RS, SRS, SRS resource indicator (SRI), and Transmitted Precoding Matrix Indicator (TPMI), including codebook, may be enhanced to enable 8 Tx UL operation to support four or more layers per UE in UL targeting CPE/FWA/vehicle/industrial devices.

For a single SRS resource in an SRS resource set with the usage of "codebook" for 8 Tx PUSCH or an "antenna switching" scheme (i.e., for eight-transmitter eight-receiver antenna switching), when the SRS resource is configured with eight ports and m OFDM symbols (m>1), the eight ports may be mapped onto the m OFDM symbols. For example, different SRS ports may be mapped onto different OFDM symbols (i.e., Time-division multiplexing (TDM)), and m may be 2, 4, 8, 10, etc.

Figure 5B:
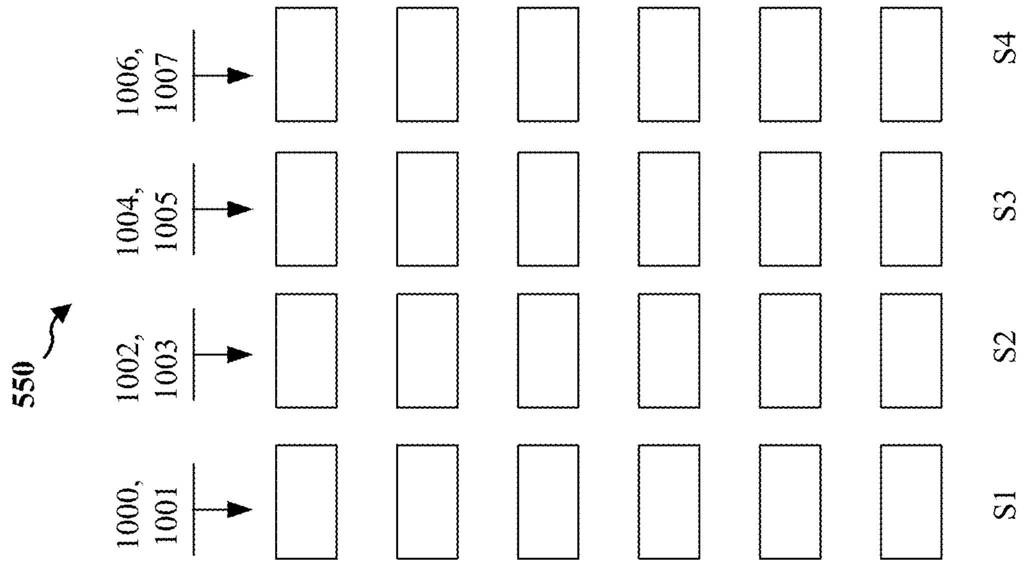
FIGS. 5A and 5B are diagrams illustrating example sounding reference signal (SRS) ports mapping to multiple orthogonal frequency division multiplexing (OFDM) symbols in accordance with various aspects of the present disclosure.
Figure 5A:
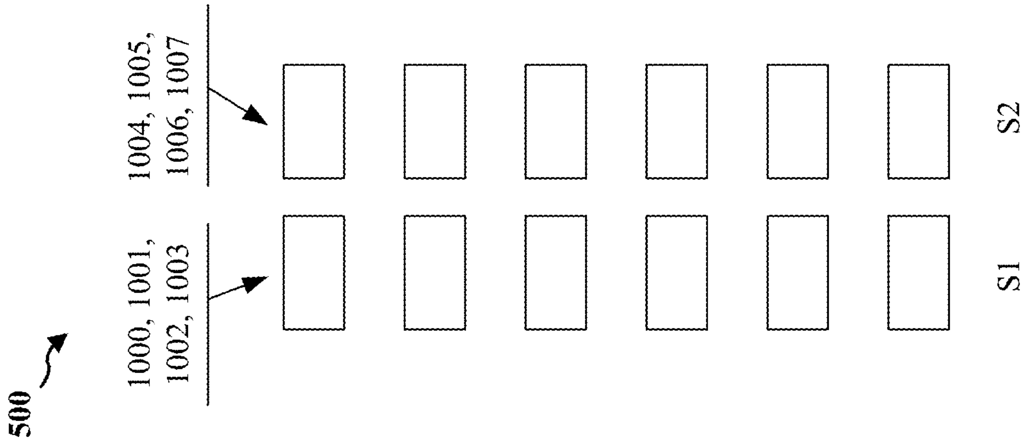

In some aspects, multiple SRS ports may be mapped to multiple OFDM symbols sequentially. For example, multiple SRS ports for 8 Tx may be mapped sequentially to multiple symbols, e.g., 1, 2, 4, or 8 OFDM symbols. In one example, eight SRS ports may be mapped to two OFDM symbols. FIG. 5A is a diagram 500 illustrating an example mapping of the eight SRS ports to two OFDM symbols, in accordance with various aspects of the present disclosure. As shown in FIG. 5A, a subset of the SRS ports, e.g., SRS ports 1000, 1001, 1002, and 1003, may be mapped to resources of the first OFDM symbol S1, and a different subset of the SRS ports, e.g., SRS ports 1004, 1005, 1006, and 1007, may be mapped to resources of the second OFDM symbol S2. In the present disclosure, an SRS port is "mapped to resources of a symbol" may also be referred to as "mapped to the symbol." In another example, eight SRS ports may be mapped to four OFDM symbols. FIG. 5B is a diagram 550 illustrating an example mapping of the eight SRS ports to four OFDM symbols in accordance with various aspects of the present disclosure. As shown in FIG. 5B, a first subset of the SRS ports, e.g., SRS ports 1000, 1001 may be mapped to the first OFDM symbol S1, a second subset of the SRS ports, e.g., SRS ports 1002, 1003 may be mapped to the second OFDM symbol S2, a third subset of the SRS ports, e.g., SRS ports 1004, 1005 may be mapped to the third OFDM symbol S3, and a fourth subset of the SRS ports, e.g., SRS ports 1006, 1007 may be mapped to the fourth OFDM symbol S4. In another example, eight SRS ports may be mapped to eight OFDM symbols sequentially. For example, the SRS port 1000 may be mapped to the first OFDM symbol, the SRS port 1001 may be mapped to the second OFDM symbol, the SRS port 1002 may be mapped to the third OFDM symbol, the SRS port 1003 may be mapped to the fourth OFDM symbol, the SRS port 1004 may be mapped to the fifth OFDM symbol, the SRS port 1005 may be mapped to the sixth OFDM symbol, the SRS port 1006 may be mapped to the seventh OFDM symbol, and the SRS port 1007 may be mapped to the eighth OFDM symbol.

When mapping eight SRS ports to multiple OFDM symbols, the SRS ports may be mapped to contiguous or non-contiguous OFDM symbols depending on the SRS usage and codebook/precoder coherency, in some aspects. For example, if the use of eight SRS ports is for codebook-based 8 Tx PUSCH and the codebook/precoder is coherent, the eight SRS ports may be mapped to M contiguous OFDM symbols, e.g., and not to non-contiguous symbols. As another example, if the use of eight SRS ports is for codebook-based 8 Tx PUSCH and the codebook/precoder is partially coherent, the SRS ports belonging to the same coherent SRS port group may be mapped to a set of contiguous OFDM symbols (e.g., rather than non-contiguous symbols), while the SRS ports that are not coherent, e.g., belonging to different coherent SRS port groups may be mapped to either non-contiguous or contiguous OFDM symbols. FIG. 6A illustrates an example mapping showing that SRS ports that are coherent (e.g., within a coherent SRS port group) are mapped to contiguous symbols, whereas the mapping between groups can be either contiguous or non-contiguous.

In another example, if the use of eight SRS ports is for codebook-based 8 Tx PUSCH and the codebook/precoder is non-coherent, the eight SRS ports may be mapped to M non-contiguous or M contiguous OFDM symbols. In another example, if the use of eight SRS ports is for codebook-based 8 Tx PUSCH and the codebook/precoder is the Antenna Switching scheme, the eight SRS ports may be mapped to M non-contiguous or M contiguous OFDM symbols.

FIG. 6A is a diagram 600 illustrating an example SRS ports mapping to multiple OFDM symbols. In the example of FIG. 6A, the use of the eight SRS ports is for codebook-based 8 Tx PUSCH and the codebook/precoder is partial coherent. As shown in FIG. 6A, the eight SRS ports (1000, 1001, 1002, 1003, 1004, 1005, 1006, and 1007) may be divided into two coherent SRS port groups. The first coherent SRS port group may include the SRS ports 1000, 1001, 1002, and 1003, and the second coherent SRS port group may include the SRS ports 1004, 1005, 1006, and 1007. The SRS ports in each of the coherent SRS port groups may be mapped to contiguous OFDM symbols, e.g., and not to non-contiguous symbols. For example, SRS ports 1000 and 1001 may be mapped to OFDM symbol S1, and SRS ports 1002 and 1003 may be mapped to OFDM symbol S2. OFDM symbols S1 and S2 may be contiguous OFDM symbols. SRS ports 1004 and 1005 may be mapped to OFDM symbol S3, and SRS ports 1006 and 1007 may be mapped to OFDM symbol S4. OFDM symbols S3 and S4 may be contiguous OFDM symbols. On the other hand, the SRS ports that belong to different SRS port groups may be mapped to either contiguous or non-contiguous OFDM symbols. For example, the SRS ports 1002 and 1003 may be mapped to OFDM symbol S2, and SRS ports 1004 and 1005 may be mapped to OFDM symbol S3. In one example, OFDM symbols S2 and S3 may be non-contiguous OFDM symbols. In another example, OFDM symbols S2 and S3 may be contiguous OFDM symbols.

In some aspects, when mapping eight SRS ports to multiple OFDM symbols, the SRS ports may be mapped to OFDM symbols in the same slot/sub-slot or different slots/sub-slots depending on the SRS usage and codebook/precoder coherency. For example, if the use of eight SRS ports is for codebook-based 8 Tx PUSCH and the codebook/precoder is coherent, the eight SRS ports may be mapped to M OFDM symbols in the same slot or same sub-slot, e.g., and not to symbols of different slots or different sub-slots. In another example, if the use of eight SRS ports is for codebook-based 8 Tx PUSCH and the codebook/precoder is partial coherent, then the SRS ports belonging to the same coherent SRS port group may be mapped to a set of OFDM symbols in the same slot or same sub-slots, e.g., and not to different slots or different sub-slots, while the SRS ports belong to different coherent SRS port groups may be mapped to OFDM symbols in either the same slot/sub-slot or in different slots/sub-slots, e.g., as illustrated in connection with FIG. 6B. In another example, if the use of eight SRS ports is for codebook-based 8 Tx PUSCH and the codebook/precoder is non-coherent, the eight SRS ports may be mapped to M OFDM symbols in the same slot/sub-slot or in different slots/sub-slots. If the use of eight SRS ports is for codebook-based 8 Tx PUSCH and the codebook/precoder is an antenna switching scheme, the eight SRS ports may be mapped to M OFDM symbols in the same slot/sub-slot or in different slots/sub-slots.

Figure 6B:
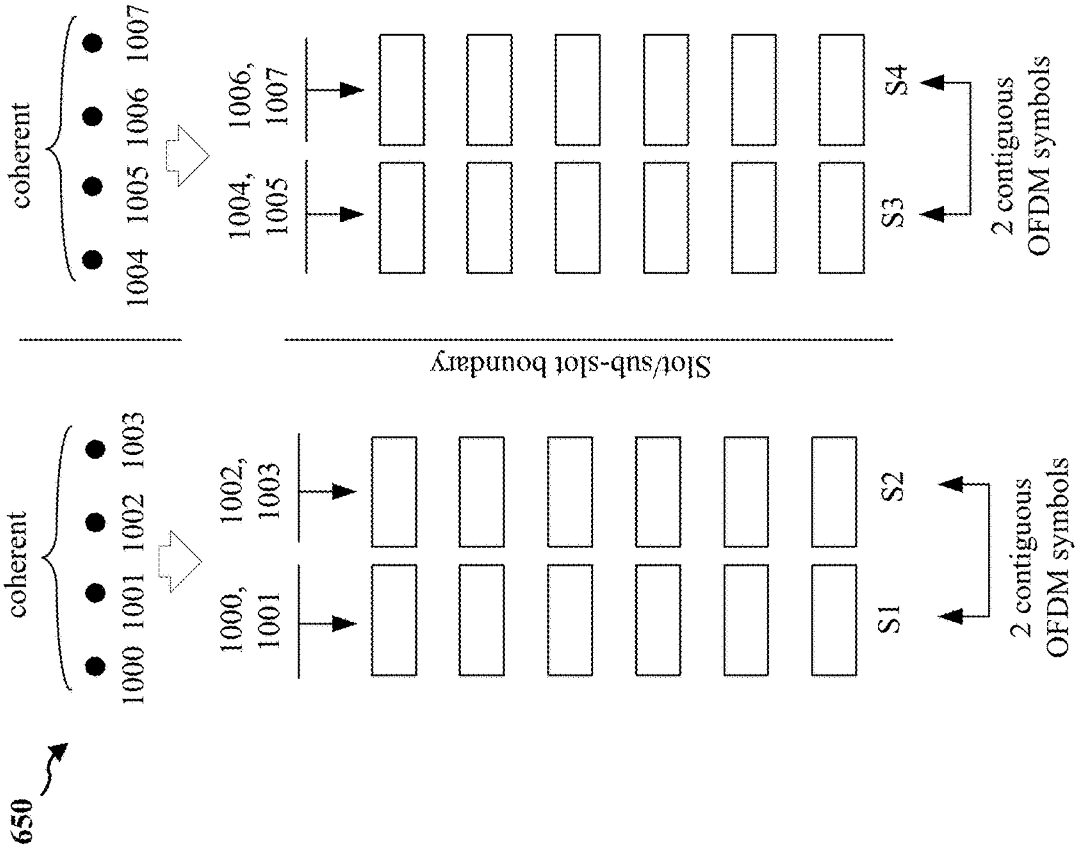
FIGS. 6A and 6B are diagrams illustrating example SRS ports mapping to multiple OFDM symbols in accordance with various aspects of the present disclosure.
Figure 6A:
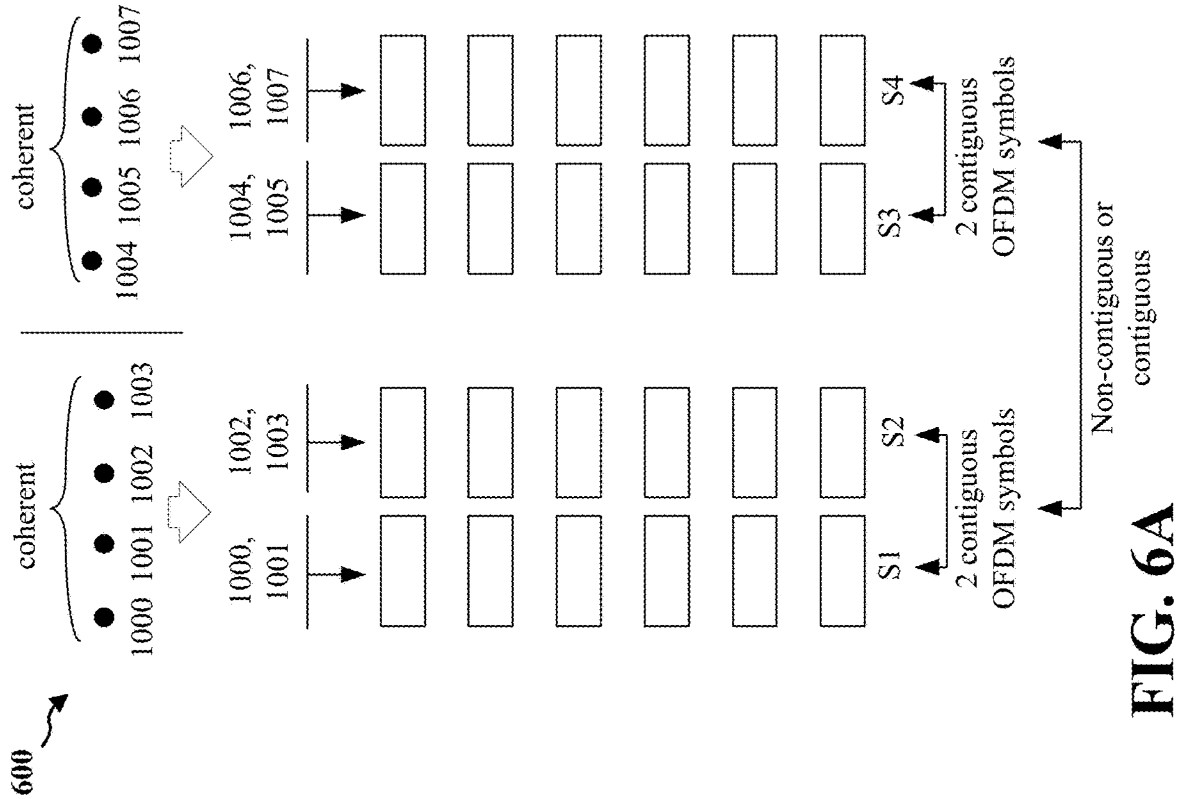

FIG. 6B is a diagram 650 illustrating an example mapping of multiple SRS ports to multiple OFDM symbols. In the example of FIG. 6B, the use of eight SRS ports is for codebook-based 8 Tx PUSCH, and the codebook/precoder is partially coherent. As shown in FIG. 6B, the eight SRS ports (1000, 1001, 1002, 1003, 1004, 1005, 1006, and 1007) may be divided into two coherent SRS port groups. The first coherent SRS port group may include the SRS ports 1000, 1001, 1002, and 1003, and the second coherent SRS port group may include the SRS ports 1004, 1005, 1006, and 1007. The SRS ports in each of the coherent SRS port groups may be mapped to OFDM symbols in the same slot/sub-slot, e.g., and not to different slots/subs-slots. For example, SRS ports 1000 and 1001 may be mapped to OFDM symbol S1, and SRS ports 1002 and 1003 may be mapped to OFDM symbol S2. OFDM symbols S1 and S2 may be in the same slot/sub-slot. SRS ports 1004 and 1005 may be mapped to OFDM symbol S3, and SRS ports 1006 and 1007 may be mapped to OFDM symbol S4. OFDM symbols S3 and S4 may be in the same slot/sub-slot. On the other hand, the SRS ports that belong to different SRS port groups may be mapped to OFDM symbols in the same slot/sub-slot or in different slots/sub-slots. For example, SRS ports 1002 and 1003 be mapped to OFDM symbol S2, and SRS ports 1004 and 1005 be mapped to OFDM symbol S3. In one example, OFDM symbols S2 and S3 may be in the same slot/sub-slot. In another example, OFDM symbols S2 and S3 may be in different slots/sub-slots.

When mapping eight SRS ports to multiple OFDM symbols, the SRS repetition may be implemented in various ways. For example, suppose a repetition factor X is configured for an SRS resource with eight SRS ports. M OFDM symbols may be configured for this SRS resource, and the SRS repetitions when mapping eight SRS ports to M OFDM symbols may be implemented in the following two configurations.

Figure 7B:
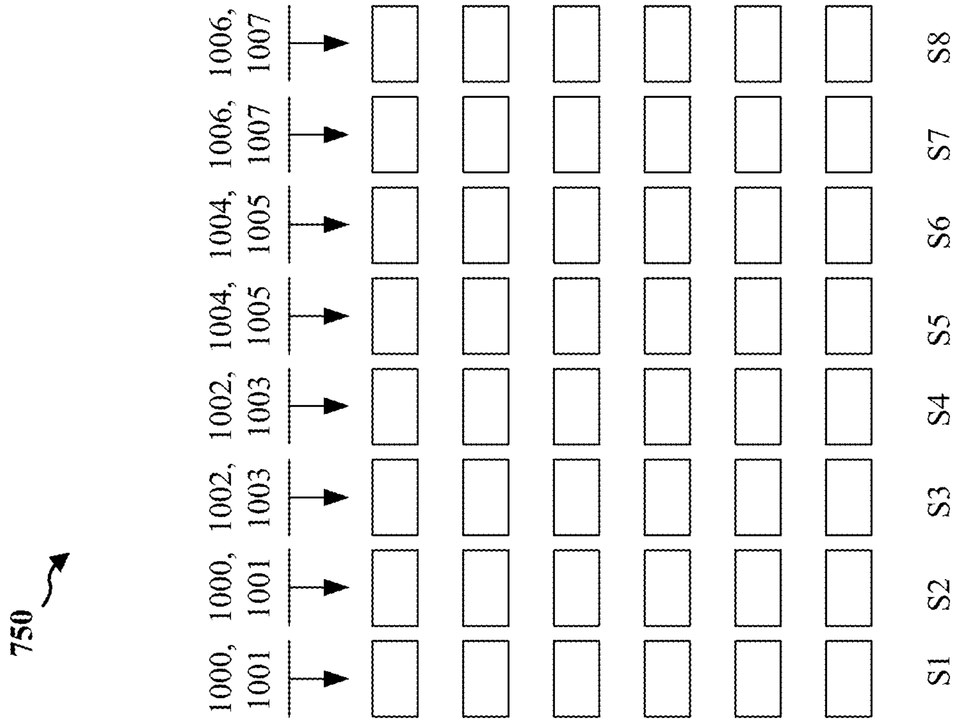
FIGS. 7A and 7B are diagrams illustrating example SRS repetitions in accordance with various aspects of the present disclosure.
Figure 7A:
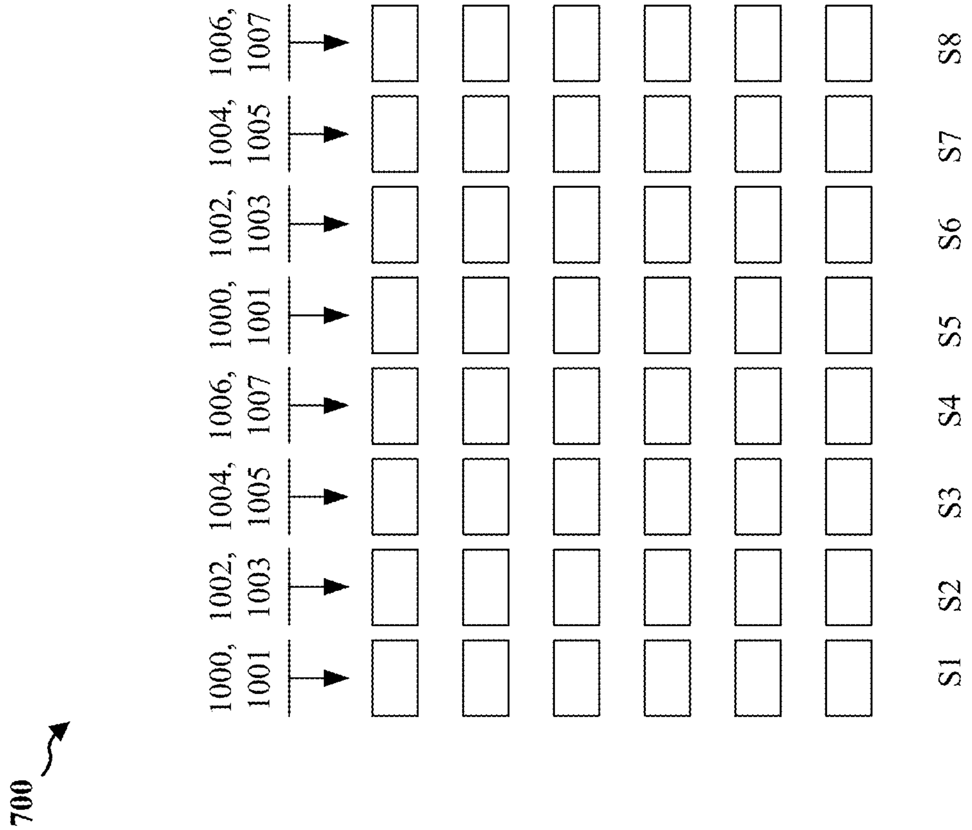

In the first configuration, the eight SRS ports may be mapped to M/X OFDM symbol(s) first. Then, the mapping may be repeated X times. FIG. 7A is diagram 700 illustrating an example SRS repetition when mapping eight SRS ports to eight OFDM symbols in accordance with various aspects of the present disclosure. In the example of FIG. 7A, the repetition factor X=2, M=8. As shown in FIG. 7A, the eight SRS ports (1000, 1001, 1002, 1003, 1004, 1005, 1006, and 1007) may be mapped to the first four (M/X=4) OFDM symbols (i.e., S1, S2, S3, and S4). When mapping the first four OFDM symbols, the first two SRS ports 1000, 1001 may be mapped to the first OFDM symbol S1, the next two SRS ports 1002, 1003 may be mapped to the second OFDM symbol S2, the following two SRS ports 1004, 1005 may be mapped to the third OFDM symbol S3, and the last two SRS ports 1006, 1007 may be mapped to the fourth OFDM symbol S4. Then, the mapping on the first four OFDM symbols (S1, S2, S3, and S4) may be repeated on the next four OFDM symbols (S5, S6, S7, and S8), as shown in FIG. 7A. That is, the mapping from the eight SRS ports (1000, 1001, 1002, 1003, 1004, 1005, 1006, and 1007) to four OFDM symbols may be repeated on the eight OFDM symbols by a time specified by the repetition factor (i.e., 2 times).

In the second configuration, the first 8X/M SRS ports may be mapped to the first OFDM symbol, and the mapping of the first 8X/M SRS ports may be repeated X times. Then, the second 8X/M ports may be mapped to the (X+1)th OFDM symbol, and the mapping of the second 8X/M SRS ports may be repeated X times. The process may continue until all the SRS ports and OFDM symbols have been mapped. FIG. 7B is diagram 750 illustrating an example SRS repetition when mapping eight SRS ports to eight OFDM symbols in accordance with various aspects of the present disclosure. In the example of FIG. 7B, the repetition factor X=2, M=8. As shown in FIG. 7B, the first group of two (8X/M=2) SRS ports (i.e., SRS ports 1000, 1001) may be mapped to the first OFDM symbol S1, and the mapping of the first group of two SRS ports may be repeated two times (on OFDM symbols S1 and S2). Then, the second group of two SRS ports (SRS ports 1002, 1003) may be mapped to the third OFDM symbol S3, and the mapping of the second group of two SRS ports may be repeated two times (on OFDM symbols S3 and S4). The process may continue until each of the SRS ports and OFDM symbols has been mapped.

Figure 8A:
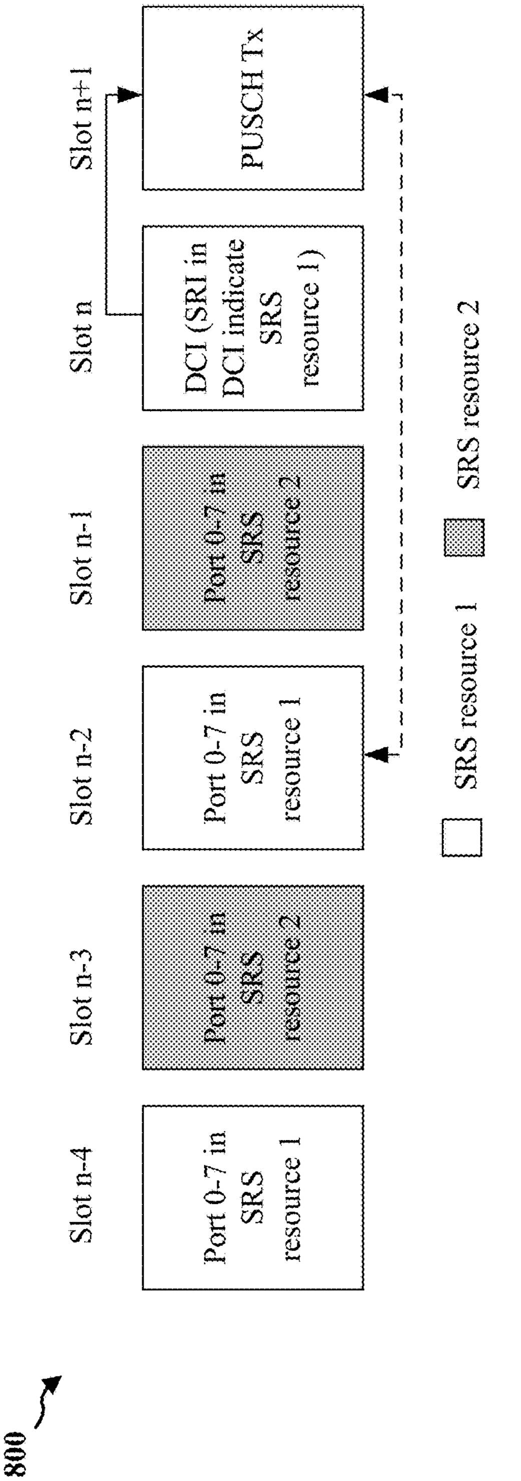
FIGS. 8A and 8B are diagrams illustrating the associations of physical uplink shared channel (PUSCH) transmissions with the SRS resources.

In wireless communication, a PUSCH transmission may be associated with the most recent transmission of the SRS resource indicated by SRI in the past. FIG. 8A is a diagram 800 illustrating the association of a PUSCH transmission with the SRS resources. As shown in FIG. 8A, the SRS resource 1 may be transmitted in slots n-4 and n-2, and the SRS resource 2 may be transmitted in slots n-3 and n-1. In slot n, the SRI in DCI may indicate that the PUSCH transmission may be associated with SRS resource 1, and the UE may associate the PUSCH transmission with the most recent SRS resource 1 transmission in the past (i.e., on slot n-2).

Figure 8B:
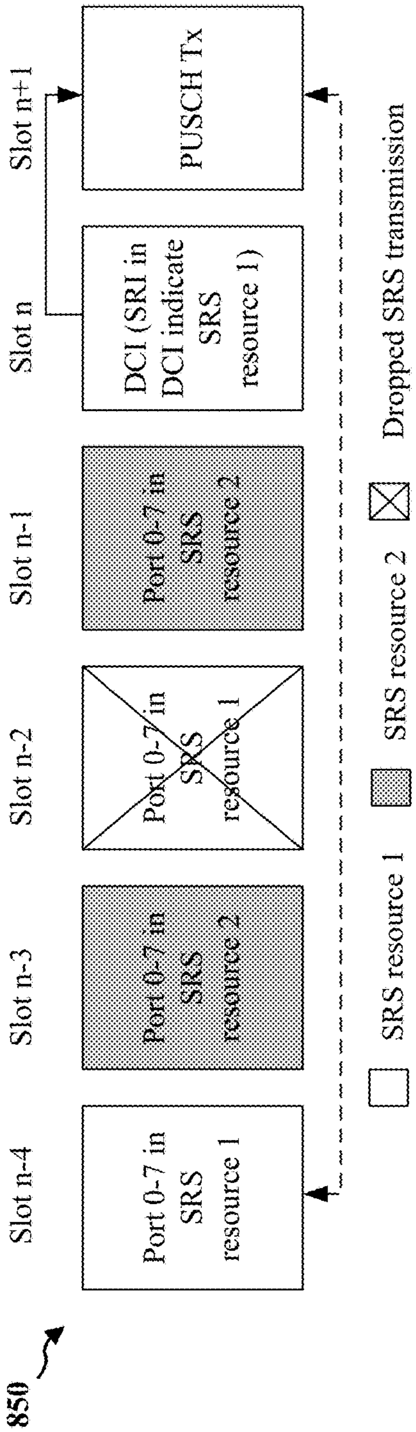

FIG. 8B is a diagram 850 illustrating the association of a PUSCH transmission with the SRS resources. As shown in FIG. 8B, if the most recent transmission of the corresponding SRS resource is dropped, for example, due to SRS colliding with, e.g., overlapping in time with, other higher priority channels, the UE may associate the PUSCH transmission with the prior transmission of the SRS resource. For example, as shown in FIG. 8B, if the SRS resource 1 transmission in slot n-2 is dropped, the UE may associate the PUSCH transmission with a prior SRS resource 1 transmission that is closest to the dropped transmission, which is the SRS resource 1 transmission in slot n-4, as shown in FIG. 8B.

Figure 9A:
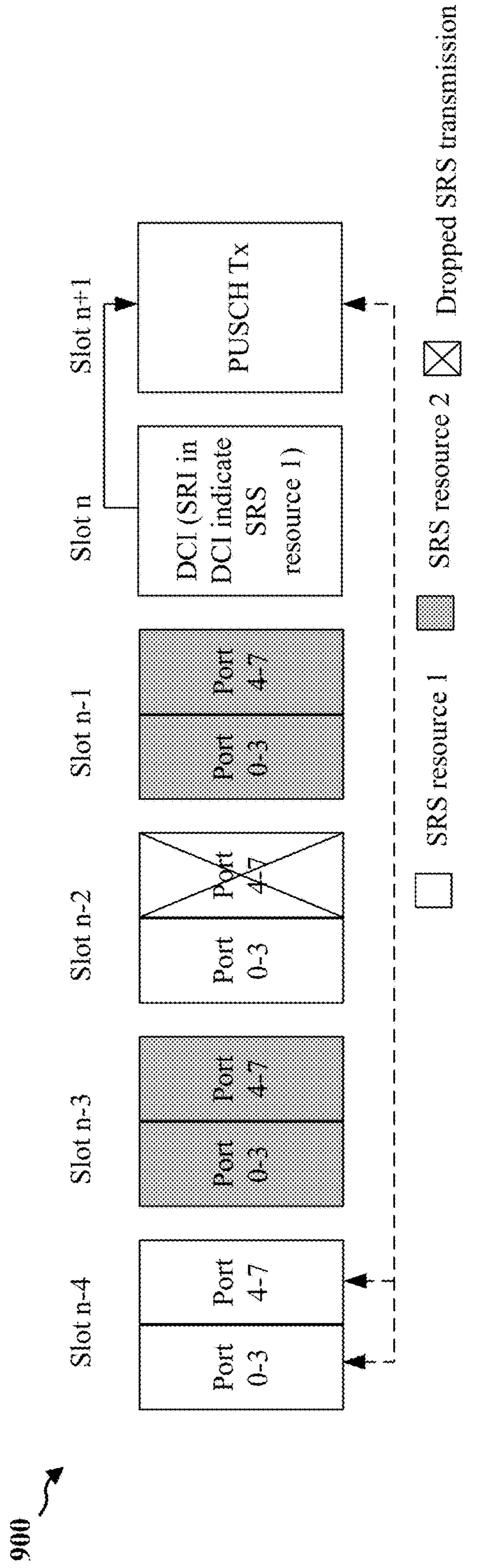
FIGS. 9A and 9B are diagrams illustrating the associations of PUSCH transmissions with the SRS resources in a partial SRS resource dropping in accordance with various aspects of the present disclosure.

When eight SRS ports are mapped to multiple OFDM symbols, a dropped SRS may be a partial drop (e.g., the dropping of a portion, but not all, of SRS resource transmission in a slot) or a full drop (e.g., the dropping of all the SRS resource transmission in a slot). In this disclosure, a dropped SRS may be referred to as an SRS that is "skipped or not transmitted." When a partial SRS dropping occurs (e.g., a portion of SRS resource transmission in a slot has been dropped), whether the remaining partial SRS resource transmission is to be associated with the PUSCH transmission in the future may be handled in various ways, depending on the SRS usage and PUSCH codebook/precoder coherency. In one configuration, when a portion of the SRS resource transmission in a slot is dropped, other portions of the SRS resource transmission in the same slot may be considered dropped as well (e.g., an SRS that is partially dropped may be treated as having been fully dropped). FIG. 9A is a diagram 900 illustrating the association of a PUSCH transmission with the SRS resources in a partial SRS resource dropping in accordance with various aspects of the present disclosure. In the example of FIG. 9A, the SRI in DCI may indicate the PUSCH transmission is associated with SRS resource 1. When the SRS ports 4-7 in the most recent SRS resource 1 transmission (i.e., slot n-2) are dropped, the remaining SRS ports in slot n-2 (i.e., SRS ports 0-3) may be considered dropped as well, and the PUSCH transmission will be associated with an earlier SRS resource 1 transmission that is closest to slot n-2, which is the SRS resource transmission on slot n-4, as shown in FIG. 9A.

Figure 9B:
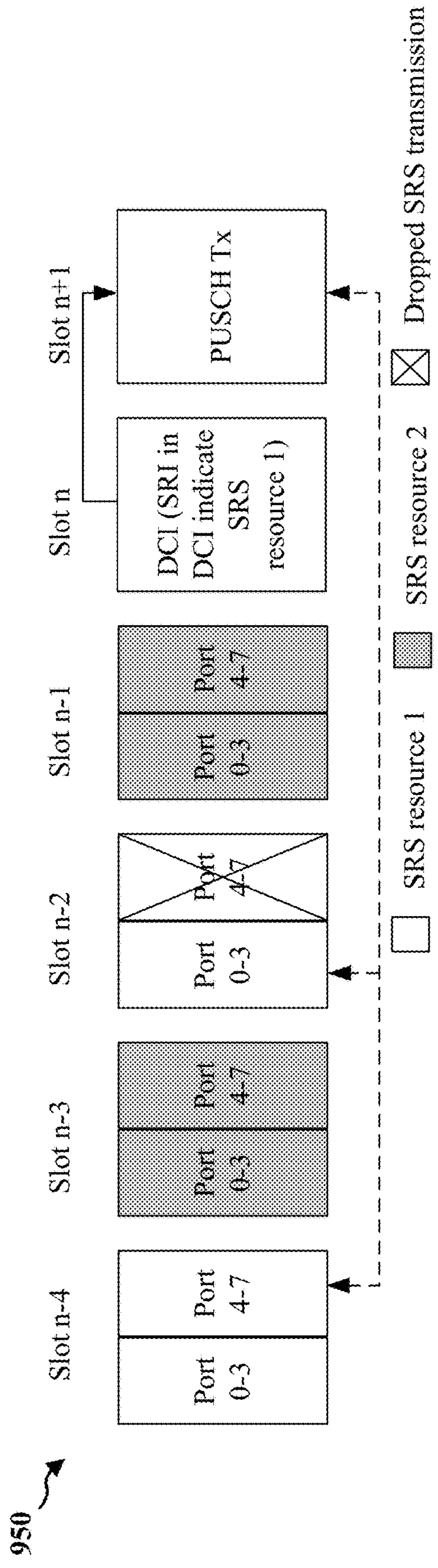

In another configuration, when a portion of the SRS resource transmission in a slot is dropped, other portions of the SRS resource transmission in the same slot may not be considered dropped. FIG. 9B is a diagram 950 illustrating the association of a PUSCH transmission with the SRS resources in a partial SRS resource dropping in accordance with various aspects of the present disclosure. In the example of FIG. 9B, the SRI in DCI may indicate the PUSCH transmission is associated with SRS resource 1. When the SRS ports 4-7 in the most recent SRS resource 1 transmission (i.e., slot n-2) are dropped, the remaining SRS ports in slot n-2 (i.e., SRS ports 0-3) may not be considered dropped and may remain associated with the PUSCH transmission. Due to the dropped SRS ports 4-7 in slot n-2, the PUSCH transmission will associate with the SRS ports 4-7 in an earlier SRS resource 1 transmission that is closest to slot n-2, which is the SRS ports 4-7 on slot n-4, as shown in FIG. 9B.

The dropping of a subset of eight SRS ports may be treated as a partial dropping or a full dropping, depending on the SRS usage and PUSCH codebook/precoder coherency. In some examples, if the usage of the eight SRS ports is for codebook-based 8 Tx PUSCH and the codebook/precoder is coherent, a partial drop may be treated as a full drop. For example, referring to FIG. 9A, a partial drop of SRS ports 4-7 on slot n-2 may be treated as a full drop on slot n-2 (i.e., the SRS ports 0-3 on slot n-2 are also considered dropped), and the PUSCH transmission will associate with SRS ports 0-7 in an earlier SRS resource 1 transmission that is closest to the dropped transmission.

Figure 10A:
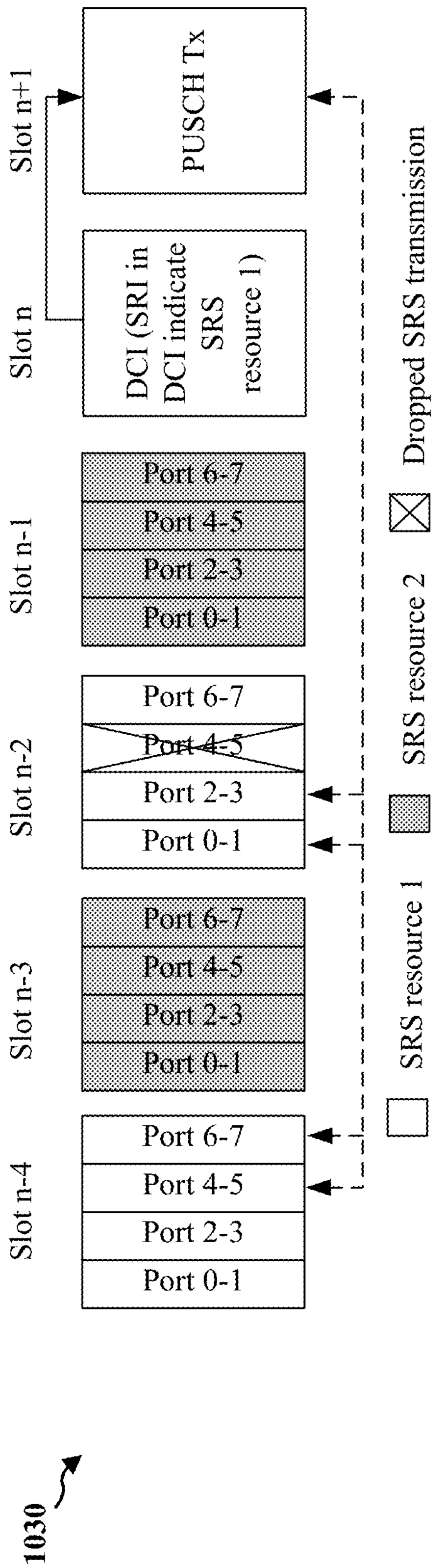
FIGS. 10A and 10B are diagrams illustrating the associations of PUSCH transmissions with the SRS resources in a partial SRS resource dropping in accordance with various aspects of the present disclosure.

In some examples, if the usage of the eight SRS ports is for codebook-based 8 Tx PUSCH and the codebook/precoder is partial coherent, a partial drop may not be treated as a full drop. In one configuration, only the SRS ports that are in the same coherent group of the dropped SRS port(s) may be considered dropped. FIG. 10A is a diagram 1030 illustrating the association of a PUSCH transmission with the SRS resources in a partial SRS resource dropping in accordance with various aspects of the present disclosure. In the example of FIG. 10A, the SRS ports 0-3 are in one coherent group, the SRS ports 4-7 are in another coherent group, and the SRI in DCI indicates that the PUSCH transmission is associated with SRS resource 1. When the SRS ports 4-5 in slot n-2 are dropped, only the SRS ports in the same coherent group as the dropped SRS ports in slot n-2 (i.e., SRS ports 6-7) are considered dropped, while other SRS ports (i.e., SRS ports 0-3) are not considered dropped. As a result, after SRS ports 4-5 in slot n-2 are dropped, the PUSCH transmission is associated with SRS ports 0-3 in slot n-2 and SRS ports 4-7 in slot n-4, as shown in FIG. 10A.

Figure 10B:
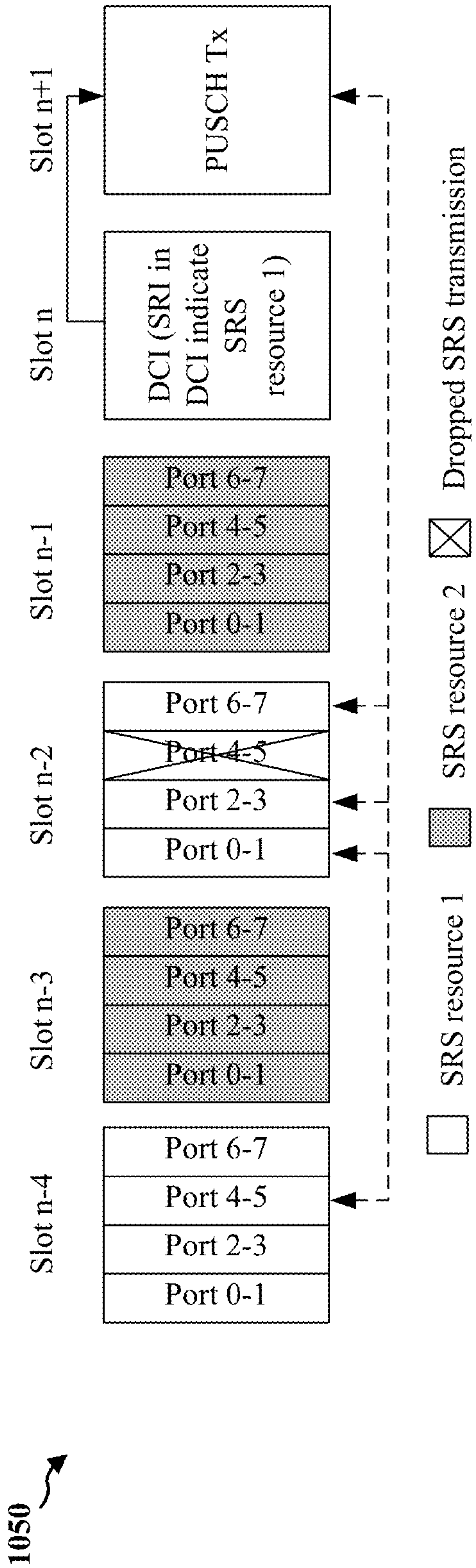

In some examples, if the usage of the eight SRS ports is for codebook-based 8 Tx PUSCH and the codebook/precoder is non-coherent, a partial drop may not be treated as a full drop, and only the SRS ports that are physically dropped may be considered dropped. In some examples, if the usage of the eight SRS ports is for codebook-based 8 Tx PUSCH and the codebook/precoder is for an antenna Switching scheme, a partial drop may not be treated as a full drop, and only the SRS ports that are physically dropped may be considered dropped. FIG. 10B is a diagram 1050 illustrating the association of a PUSCH transmission with the SRS resources in a partial SRS resource dropping in accordance with various aspects of the present disclosure. In the example of FIG. 10B, the SRS ports 0-3 are in one coherent group, the SRS ports 4-7 are in another coherent group, and the SRI in DCI indicates that the PUSCH transmission is associated with SRS resource 1. As shown in FIG. 10B, when the SRS ports 4-5 in slot n-2 are dropped, only the SRS ports that are physically dropped are treated as dropped, while all other SRS ports (i.e., ports 0-3 and 6-7) in slot n-2 are not treated as dropped. As a result, after SRS ports 4-5 in slot n-2 are dropped, the PUSCH transmission is associated with SRS ports 0-3 and 6-7 in slot n-2 and SRS ports 4-5 in slot n-4, as shown in FIG. 10B.

Figure 11:
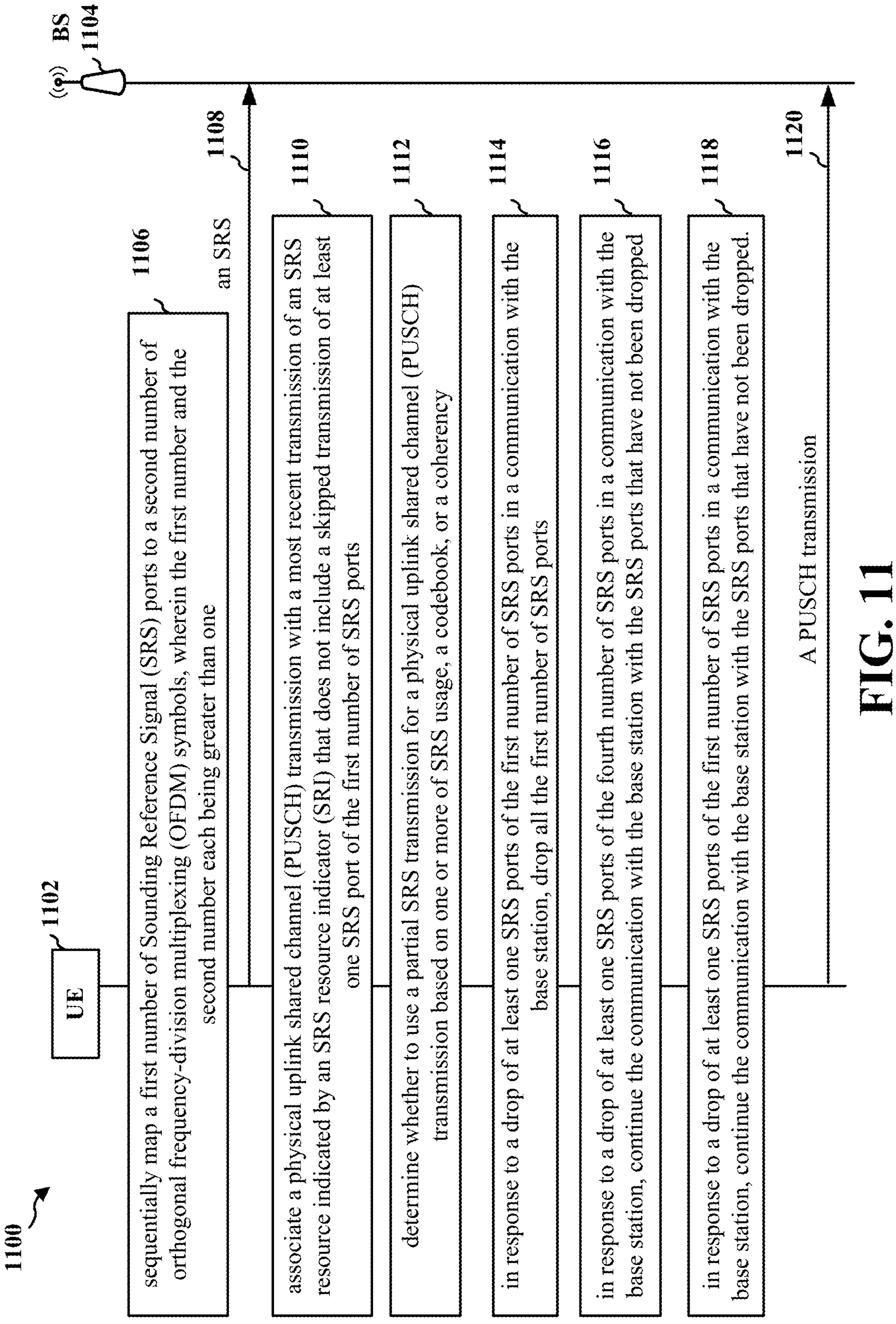
FIG. 11 is a call flow diagram illustrating a method of wireless communication in accordance with various aspects of the present disclosure.

FIG. 11 is a call flow diagram 1100 illustrating a method of wireless communication in accordance with various aspects of this present disclosure. Although aspects are described for a base station 1104, the aspects may be performed by a base station in aggregation and/or by one or more components of a base station 1104 (e.g., a CU 110, a DU 130, and/or an RU 140).

As shown in FIG. 11, a UE 1102 may, at 1106, sequentially map a first number of SRS ports to a second number of OFDM symbols. The first number and the second number may each be greater than one. In one example, the UE 1102 may sequentially map eight SRS ports to four OFDM symbols, according to FIG. 6A. In another example, the UE 1102 may sequentially map eight SRS ports to eight OFDM symbols, according to FIG. 7A or FIG. 7B.

At 1108, the UE 1102 may transmit an SRS from the first number of SRS ports over the second number of OFDM symbols based on the mapping.

At 1110, the UE 1102 may associate a PUSCH transmission with a most recent transmission of an SRS resource indicated by an SRI that does not include a skipped transmission of at least one SRS port of the first number of SRS ports. For example, referring to FIG. 9A, the UE may associate a PUSCH transmission (on slot n+1) with a transmission of SRS resource 1 at slot n-4. SRS resource 1 is indicated by an SRI at slot n, and slot n-4 does not include a skipped transmission of at least one SRS port of the eight SRS ports.

At 1112, the UE 1102 may determine whether to use a partial SRS transmission for a PUSCH transmission based on one or more of SRS usage, a codebook, or a coherency. For example, the UE may, based on whether the SRS usage is for codebook-based 8 Tx PUSCH, and a coherency of the codebook/precoder, determine whether to use a partial SRS transmission (e.g., SRS transmission on Ports 0-3 on slot n-2) for a PUSCH transmission, as shown in FIG. 9B.

At 1114, the UE 1102 may, in response to a drop of at least one SRS port of the first number of SRS ports in communication with the base station 1104, drop all the first number of SRS ports. For example, as shown in FIG. 9A, the UE may, in response to a drop of at least one SRS port (i.e., the drop of SRS ports 4-7 in slot n-2) of eight SRS ports in communication with the base station, drop all the eight SRS ports (SRS ports 0-7 in slot n-2).

At 1116, the UE 1102 may, in response to a drop of at least one SRS port of the fourth number of SRS ports in communication with base station 1104, continue the communication with the base station 1104 with the SRS ports that have not been dropped. For example, referring to FIG. 10B, the UE may, in response to a drop of at least one SRS port (e.g., the drop of SRS ports 4-5 in slot n-2) of the fourth number of SRS ports in communication with the base station, continue the communication with the network entity with the SRS ports that have not been dropped (e.g., SRS ports 0-3 and 6-7 in slot n-2).

At 1118, the UE 1102 may, in response to a drop of at least one SRS port of the first number of SRS ports in communication with the base station, continue the communication with the base station 1104 with the SRS ports that have not been dropped. For example, referring to FIG. 10B, the UE may, in response to a drop of at least one SRS port (e.g., the drop of SRS ports 4-5 in slot n-2) of the first number of SRS ports in communication with the base station, continue the communication with the base station with the SRS ports that have not been dropped (e.g., SRS ports 0-3 and 6-7 in slot n-2).

At 1120, the UE 1102 may transmit a PUSCH transmission to the base station 1104.

Figure 12:
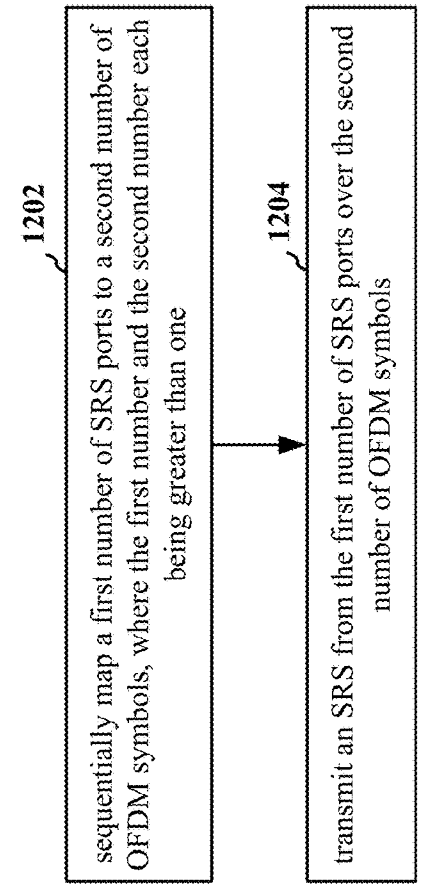
FIG. 12 is a flowchart illustrating methods of wireless communication at a UE in accordance with various aspects of the present disclosure.

FIG. 12 is a flowchart 1200 illustrating methods of wireless communication at a UE in accordance with various aspects of the present disclosure. The method may be performed by a UE. The UE may be the UE 104, 350, 1102, or the apparatus 1604 in the hardware implementation of FIG. 16. The method enables or enhances 8 Tx UL operation to support four and more layers per UE in UL targeting devices. Thus, the aspects presented herein improve the efficiency of wireless communication.

As shown in FIG. 12, at 1202, the UE may sequentially map a first number of SRS ports to a second number of OFDM symbols. The first number and the second number may each be greater than one. The network entity may be a base station, or a component of a base station, in the access network of FIG. 1 or a core network component (e.g., base station 102, 310, 1104; or the network entity 1602 in the hardware implementation of FIG. 16). FIGS. 5A, 5B, 6A, 6B, 7A, 7B, 8A, 8B, 9A, 9B, 10A, 10B, and 11 illustrate various aspects of the steps in connection with flowchart 1200. For example, referring to FIG. 11, the UE 1102 may, at 1106, sequentially map a first number of SRS ports to a second number of OFDM symbols. In one example, referring to FIG. 6A, the UE may sequentially map eight SRS ports to four OFDM symbols. In another example, referring to FIG. 7B, the UE may sequentially map eight SRS ports to eight OFDM symbols. In some aspects, 1202 may be performed by the SRS mapping component 198.

At 1204, the UE may transmit an SRS from the first number of SRS ports over the second number of OFDM symbols based on the mapping. For example, referring to FIG. 11, the UE 1102 may transmit, at 1108, an SRS from the first number of SRS ports over the second number of OFDM symbols based on the mapping, performed at 1106. In some aspects, 1204 may be performed by the SRS mapping component 198.

Figure 13:
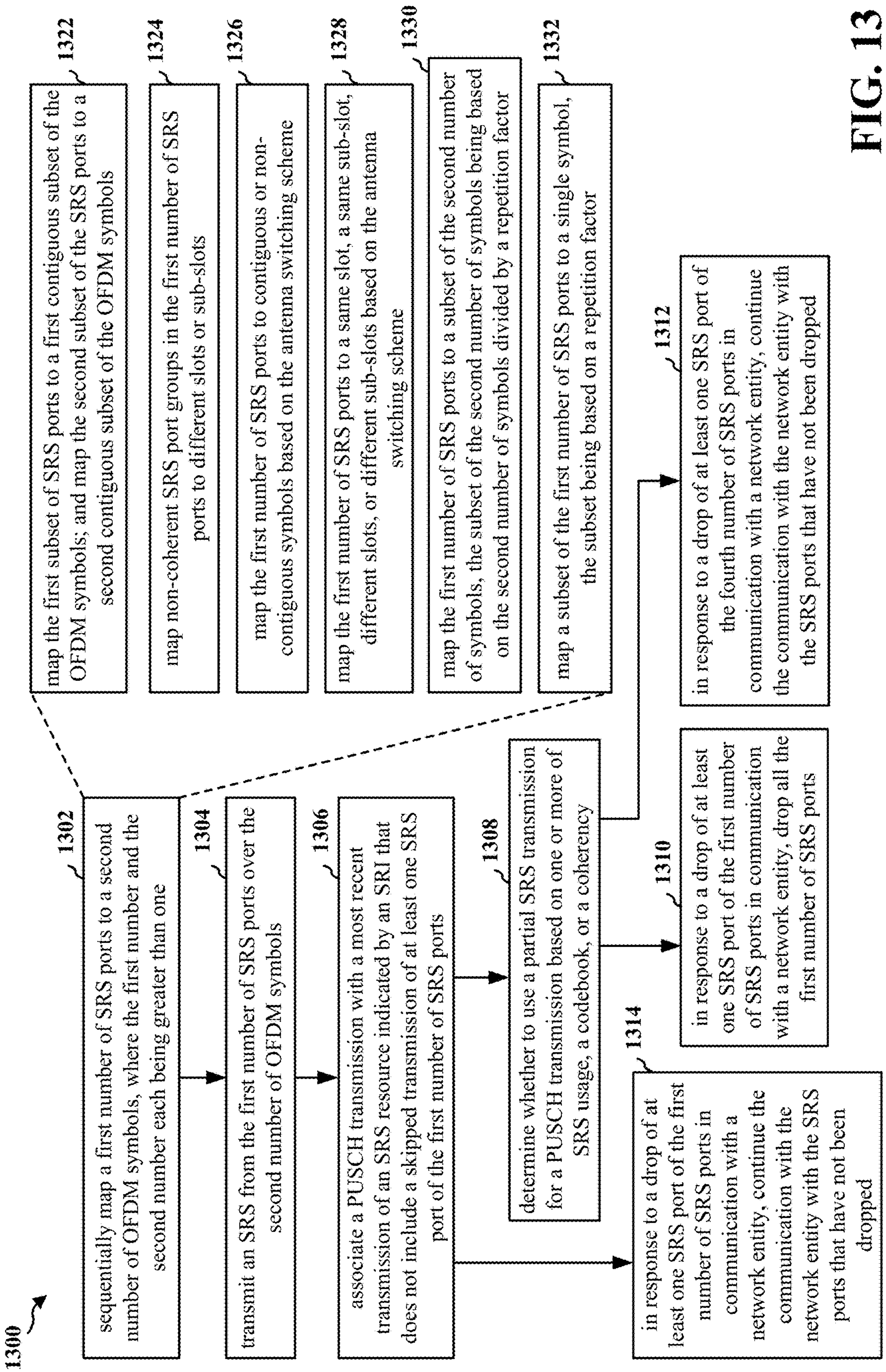
FIG. 13 is a flowchart illustrating methods of wireless communication at a UE in accordance with various aspects of the present disclosure.

FIG. 13 is a flowchart 1300 illustrating methods of wireless communication at a UE in accordance with various aspects of the present disclosure. The method may be performed by a UE. The UE may be the UE 104, 350, 1102, or the apparatus 1604 in the hardware implementation of FIG. 16. The method enables or enhances 8 Tx UL operation to support four and more layers per UE in UL targeting devices. Thus, the aspects presented herein improve the efficiency of wireless communication.

As shown in FIG. 13, at 1302, the UE may sequentially map a first number of SRS ports to a second number of OFDM symbols. The first number and the second number may each be greater than one. The network entity may be a base station, or a component of a base station, in the access network of FIG. 1 or a core network component (e.g., base station 102, 310, 1104; or the network entity 1602 in the hardware implementation of FIG. 16). FIGS. 5A, 5B, 6A, 6B, 7A, 7B, 8A, 8B, 9A, 9B, 10A, 10B, and 11 illustrate various aspects of the steps in connection with flowchart 1300. For example, referring to FIG. 11, the UE 1102 may, at 1106, sequentially map a first number of SRS ports to a second number of OFDM symbols. In one example, referring to FIG. 6A, the UE may sequentially map eight SRS ports to four OFDM symbols. In another example, referring to FIG. 7B, the UE may sequentially map eight SRS ports to eight OFDM symbols. In some aspects, 1302 may be performed by the SRS mapping component 198.

At 1304, the UE may transmit an SRS from the first number of SRS ports over the second number of OFDM symbols based on the mapping. For example, referring to FIG. 11, the UE 1102 may transmit, at 1108, an SRS from the first number of SRS ports over the second number of OFDM symbols based on the mapping, performed at 1106. In some aspects, 1304 may be performed by the SRS mapping component 198.

In some aspects, the SRS ports may be based on a codebook. The first subset of the SRS ports may be coherent and the second subset of the SRS ports may be coherent. The first subset of the SRS ports may be incoherent with the second subset of the SRS ports. For example, referring to FIG. 6A, the first subset of the SRS ports (SRS ports 1000-1003) may be coherent and the second subset of the SRS ports (SRS ports 1004-1007) may be coherent. The first subset of the SRS ports (SRS ports 1000-1003) may be incoherent with the second subset of the SRS ports (SRS ports 1004-1007).

In some aspects, to sequentially map the first number of SRS ports to the second number of OFDM symbols (at 1302), the UE may, at 1322, map the first subset of SRS ports to a first contiguous subset of the OFDM symbols; and map the second subset of the SRS ports to a second contiguous subset of the OFDM symbols. For example, referring to FIG. 6A, the UE may map the first subset of SRS ports (SRS ports 1000-1003) to a first contiguous subset of the OFDM symbols (S1, S2); and map the second subset of the SRS ports (SRS ports 1004-1007) to a second contiguous subset of the OFDM symbols (S3, S4). In some aspects, 1322 may be performed by the SRS mapping component 198.

In some aspects, the first contiguous subset of the OFDM symbols may be contiguous or non-contiguous with the second contiguous subset of the OFDM symbols. For example, referring to FIG. 6A, the first contiguous subset of the OFDM symbols may be OFDM symbols S1 and S2, and the second contiguous subset of the OFDM symbols may be OFDM symbols S3 and S4. The first contiguous subset of the OFDM symbols (S1 and S2) may be contiguous or non-contiguous with the second contiguous subset of the OFDM symbols (S3 and S4).

In some aspects, the first number of SRS ports may be mapped to the second number of OFDM symbols within the same slot or sub-slot based on the first number of SRS ports being a coherent SRS port group. For example, referring to FIG. 6B, the first number of SRS ports (SRS ports 1000-1003) may be mapped to the second number of OFDM symbols (S1 and S2) within the same slot or sub-slot based on the first number of SRS ports being a coherent SRS port group.

In some aspects, to sequentially map the first number of SRS ports to the second number of OFDM symbols (at 1302), the UE may, at 1324, map non-coherent SRS port groups in the first number of SRS ports to different slots or sub-slots. For example, referring to FIG. 6B, the UE may map SRS ports 1002 and 1003 to OFDM symbol S2, and map SRS ports 1004 and 1005 to OFDM symbol S3. OFDM symbols S2 and S3 may be in different slots or sub-slots. In some aspects, 1324 may be performed by the SRS mapping component 198.

In some aspects, the usage of the first number of SRS ports may be for codebook-based PUSCH, and codebooks for the first number of the SRS ports may be for an antenna switching scheme. To sequentially map the first number of SRS ports to the second number of OFDM symbols (at 1302), the UE may, at 1326, map the first number of SRS ports to contiguous or non-contiguous symbols based on the antenna switching scheme. For example, referring to FIG. 5A, the UE may map eight SRS ports (SRS ports 1000-1007) to two OFDM symbols (S1 and S2). If the usage of the eight SRS ports is for codebook-based PUSCH, and codebooks for the eight SRS ports are for an antenna switching scheme, two OFDM symbols (S1 and S2) may be contiguous or non-contiguous symbols. In some aspects, 1326 may be performed by the SRS mapping component 198.

In some aspects, the usage of the first number of SRS ports may be for codebook-based PUSCH, and codebooks for the first number of the SRS ports may be for an antenna switching scheme. To sequentially map the first number of SRS ports to the second number of OFDM symbols (at 1302), the UE may, at 1328, map the first number of SRS ports to the same slot, the same sub-slot, different slots, or different sub-slots based on the antenna switching scheme. For example, referring to FIG. 5A, the UE may map eight SRS ports (SRS ports 1000-1007) to two OFDM symbols (S1 and S2). If the usage of the eight SRS ports is for codebook-based PUSCH, and codebooks for the eight SRS ports are for an antenna switching scheme, two OFDM symbols (S1 and S2) may be in the same slot, the same sub-slot, different slots, or different sub-slots. In some aspects, 1328 may be performed by the SRS mapping component 198.

In some aspects, to sequentially map the first number of SRS ports to the second number of OFDM symbols (at 1302), the UE may, at 1330, map the first number of SRS ports to a subset of the second number of symbols. The subset of the second number of symbols may be based on the second number of symbols divided by a repetition factor. In some examples, the mapping from the first number of SRS ports to the subset of the second number of symbols may be repeated on the second number of symbols by a time specified by the repetition factor. For example, referring to FIG. 7A, when sequentially mapping the first number (i.e., 8) of SRS ports (SRS ports 1000-1007) to the second number (i.e., 8) of OFDM symbols (S1-S8), assuming a repetition factor of 2, the UE may map the first number (i.e., 8) of SRS ports (SRS ports 1000-1007) to a subset of the second number of symbols (i.e., symbols S1-S4). The subset of the second number of symbols may be based on the second number of symbols (i.e., 8) divided by a repetition factor (i.e., 2). The mapping from the first number of SRS ports (SRS ports 1000-1007) to the subset of the second number of symbols may be repeated on the second number of symbols by a time specified by the repetition factor (i.e., 2 times). In some aspects, 1330 may be performed by the SRS mapping component 198. to the second number (i.e., 8) of OFDM symbols (S1-S8), assuming a repetition factor of 2, the UE may map the first number (i.e., 8) of SRS ports (SRS ports 1000-1007) to a subset of the second number of symbols (i.e., symbols S1-S4). The subset of the second number of symbols may be based on the second number of symbols (i.e., 8) divided by a repetition factor (i.e., 2). The mapping from the first number of SRS ports (SRS ports 1000-1007) to the subset of the second number of symbols may be repeated on the second number of symbols by a time specified by the repetition factor (i.e., 2 times). In some aspects, 1330 may be performed by the SRS mapping component 198.

In some aspects, to sequentially map the first number of SRS ports to the second number of OFDM symbols (at 1302), the UE may, at 1332, map a subset of the first number of SRS ports to a single symbol, the subset is based on a repetition factor. For example, referring to FIG. 7B, when sequentially mapping eight SRS ports (SRS ports 1000-1007) to eight OFDM symbols (S1-S8), assuming a repetition factor of 2, the UE may map a subset of the first number of SRS ports (SRS ports 1000-1001) to a single symbol (S1). The subset (i.e., 2 SRS ports) may be based on the repetition factor (i.e., 2). In some aspects, 1332 may be performed by the SRS mapping component 198.

In some aspects, the UE may, at 1306, further associate a PUSCH transmission with a most recent transmission of an SRS resource indicated by an SRI that does not include a skipped transmission of at least one SRS port of the first number of SRS ports. For example, referring to FIG. 11, the UE 1102 may, at 1110, associate a PUSCH transmission with a most recent transmission of an SRS resource indicated by an SRI that does not include a skipped transmission of at least one SRS port of the first number of SRS ports. Referring to FIG. 9A, the UE may associate a PUSCH transmission (on slot n+1) with a transmission of SRS resource 1 at slot n-4. SRS resource 1 is indicated by an SRI at slot n, and slot n-4 does not include a skipped transmission of at least one SRS port of the eight SRS ports. In some aspects, 1306 may be performed by the SRS mapping component 198.

In some aspects, the UE may, at 1308, determine whether to use a partial SRS transmission for a PUSCH transmission based on one or more of SRS usage, a codebook, or a coherency. For example, referring to FIG. 11, the UE 1102 may, at 1112, determine whether to use a partial SRS transmission for a PUSCH transmission based on one or more of SRS usage, a codebook, or a coherency. Referring to FIG. 9B, the UE may, based on whether the SRS usage is for codebook-based 8 Tx PUSCH, and a coherency of the codebook/precoder, determine whether to use a partial SRS transmission (e.g., SRS transmission on Ports 0-3 on slot n-2) for a PUSCH transmission. In some aspects, 1308 may be performed by the SRS mapping component 198.

In some aspects, the SRS usage of the first number of SRS ports may be for a codebook-based PUSCH, and the first number of SRS ports may include a third number of SRS ports having codebooks that are coherent, and the UE may, at 1310, in response to a drop of at least one SRS port of the first number of SRS ports in communication with a network entity, drop all the first number of SRS ports. For example, referring to FIG. 11, the UE 1102 may, at 1114, in response to a drop of at least one SRS port of the first number of SRS ports in communication with a network entity (base station 1104), drop all the first number of SRS ports. For example, as shown in FIG. 9A, the UE may in response to a drop of at least one SRS port (i.e., the drop of SRS ports 4-7 in slot n-2) of eight SRS ports in communication with a network entity, drop all the eight SRS ports (SRS ports 0-7 in slot n-2). In some aspects, 1310 may be performed by the SRS mapping component 198.

In some aspects, the usage of the first number of SRS ports may be for codebook-based PUSCH, and the first number of SRS ports may include a fourth number of SRS ports having codebooks that are non-coherent, and the UE may, at 1312, in response to a drop of at least one SRS port of the fourth number of SRS ports in communication with a network entity, continue the communication with the network entity with the SRS ports that have not been dropped. For example, referring to FIG. 11, the UE 1102 may, at 1116, in response to a drop of at least one SRS port of the fourth number of SRS ports in communication with a network entity (base station 1104), continue the communication with the network entity (base station 1104) with the SRS ports that have not been dropped. For example, referring to FIG. 10B, the UE may, in response to a drop of at least one SRS port (e.g., the drop of SRS ports 4-5 in slot n-2) of the fourth number of SRS ports in communication with the network entity, continue the communication with the network entity with the SRS ports that have not been dropped (e.g., SRS ports 0-3 and 6-7 in slot n-2). In some aspects, 1312 may be performed by the SRS mapping component 198.

In some aspects, the SRS usage of the first number of SRS ports may be for codebook-based PUSCH, and codebooks for the first number of the SRS ports may be for an antenna switching scheme, and the UE may, at 1314, in response to a drop of at least one SRS port of the first number of SRS ports in communication with a network entity, continue the communication with the network entity with the SRS ports that have not been dropped. For example, referring to FIG. 11, the UE 1102 may, at 1118, in response to a drop of at least one SRS port of the first number of SRS ports in communication with a network entity (base station 1104), continue the communication with the network entity (base station 1104) with the SRS ports that have not been dropped. For example, referring to FIG. 10B, the UE may, in response to a drop of at least one SRS port (e.g., the drop of SRS ports 4-5 in slot n-2) of the first number of SRS ports in communication with the network entity, continue the communication with the network entity with the SRS ports that have not been dropped (e.g., SRS ports 0-3 and 6-7 in slot n-2). In some aspects, 1314 may be performed by the SRS mapping component 198.

Figure 14:
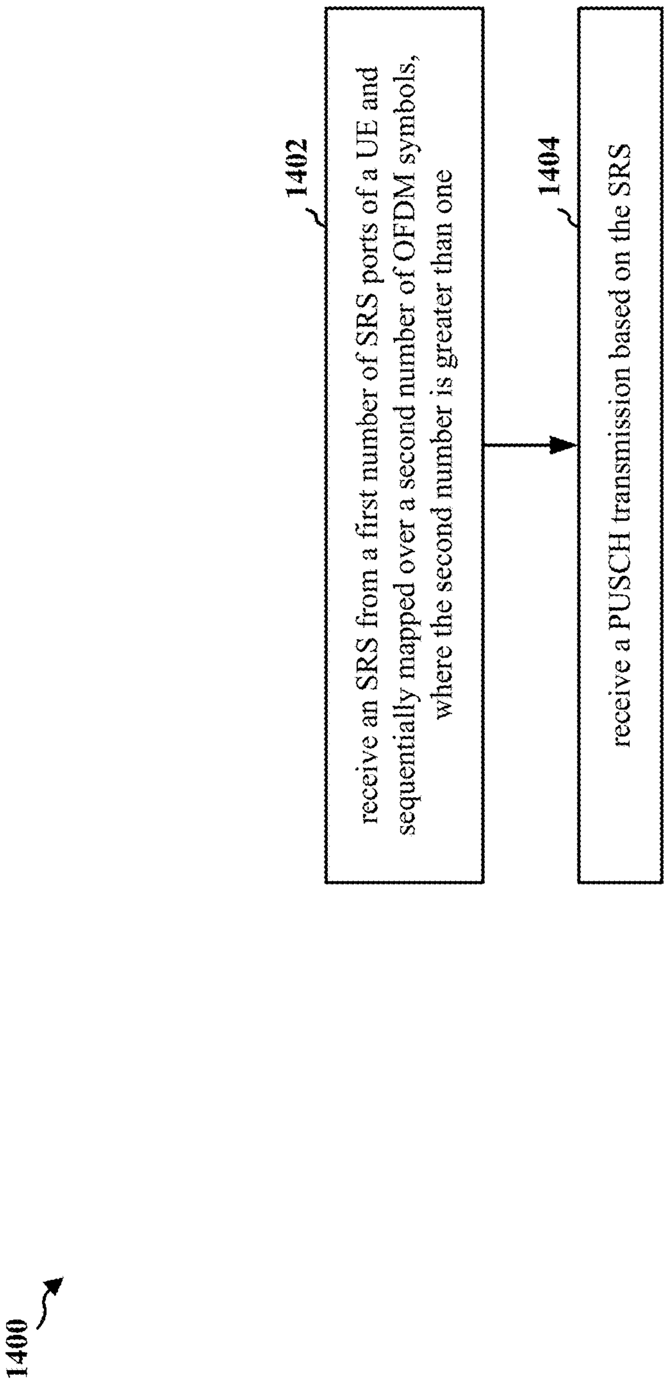
FIG. 14 is a flowchart illustrating methods of wireless communication at a network entity in accordance with various aspects of the present disclosure.

FIG. 14 is a flowchart 1400 illustrating methods of wireless communication at a network entity in accordance with various aspects of the present disclosure. The method may be performed by a network entity. The network entity may be a base station, or a component of a base station, in the access network of FIG. 1 or a core network component (e.g., base station 102, 310, 1104; or the network entity 1602 in the hardware implementation of FIG. 16). The method enables or enhances 8 Tx UL operation to support four and more layers per UE in UL targeting devices. Thus, the aspects presented herein improve the efficiency of wireless communication.

As shown in FIG. 14, at 1402, the network entity may receive an SRS from a first number of SRS ports of a UE and sequentially mapped over a second number of OFDM symbols. The second number may be greater than one. The UE may be the UE 104, 350, 1102, or the apparatus 1604 in the hardware implementation of FIG. 16. FIGS. 5A, 5B, 6A, 6B, 7A, 7B, 8A, 8B, 9A, 9B, 10A, 10B, and 11 illustrate various aspects of the steps in connection with flowchart 1400. For example, referring to FIG. 11, the network entity (base station 1104) may receive, at 1108, an SRS from a first number of SRS ports of a UE 1102 and sequentially mapped over a second number of OFDM symbols. In one example, referring to FIG. 6A, eight SRS ports (SRS ports 1000-1007) may be mapped to four OFDM symbols (S1-S4). In another example, referring to FIG. 7B, eight SRS ports (SRS ports 1000-1007) may be mapped to eight OFDM symbols (S1-S8). In some aspects, 1402 may be performed by the SRS reception component 199.

At 1404, the network entity may receive a PUSCH transmission based on the SRS. For example, referring to FIG. 11, the network entity (base station 1104) may receive, at 1120, a PUSCH transmission based on the SRS (received at 1108). In some aspects. 1404 may be performed by the SRS reception component 199.

Figure 15:
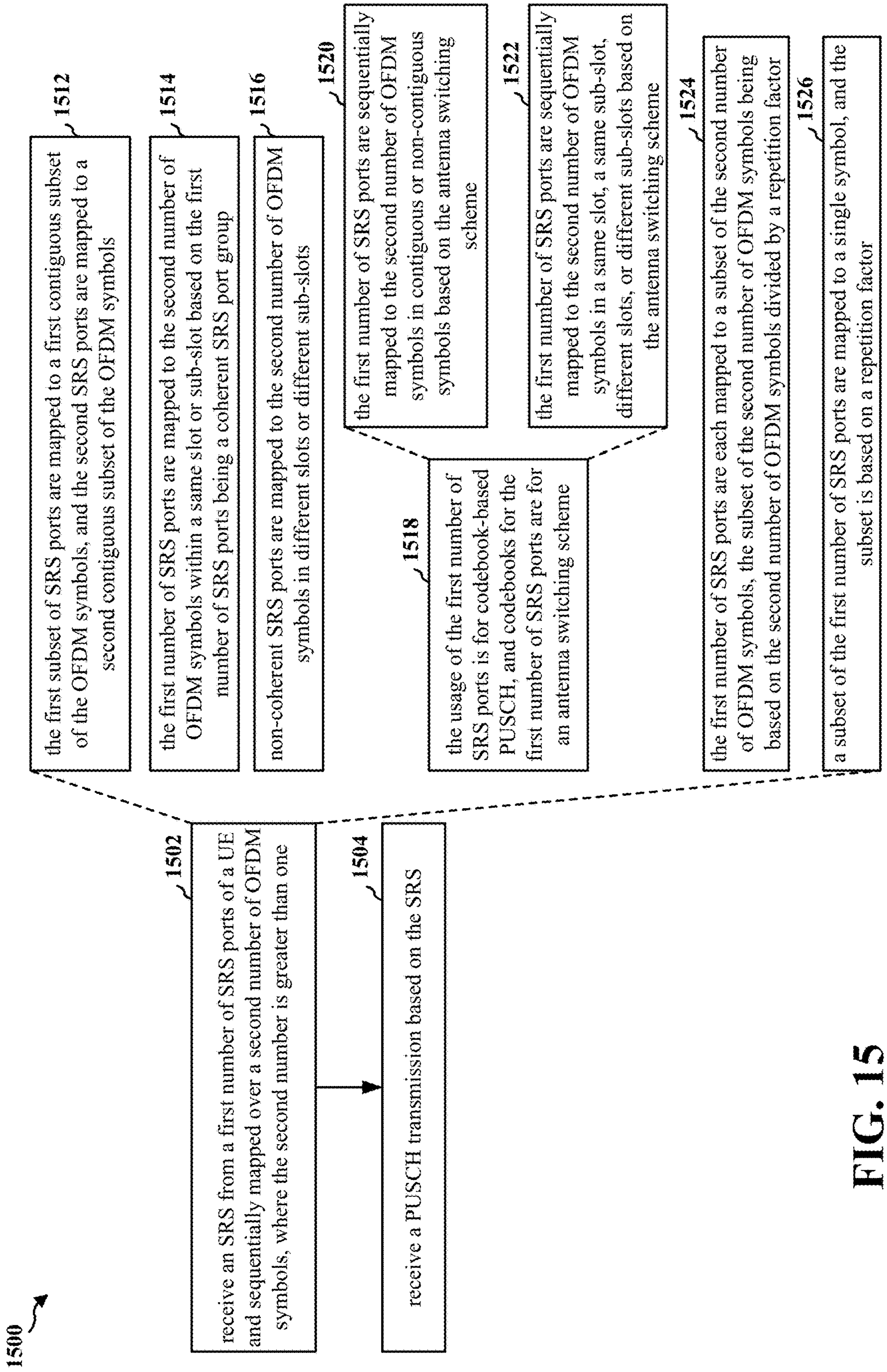
FIG. 15 is a flowchart illustrating methods of wireless communication at a network entity in accordance with various aspects of the present disclosure.

FIG. 15 is a flowchart 1500 illustrating methods of wireless communication at a network entity in accordance with various aspects of the present disclosure. The method may be performed by a network entity. The network entity may be a base station, or a component of a base station, in the access network of FIG. 1 or a core network component (e.g., base station 102, 310, 1104; or the network entity 1602 in the hardware implementation of FIG. 16). The method enables or enhances 8 Tx UL operation to support four and more layers per UE in UL targeting devices. Thus, the aspects presented herein improve the efficiency of wireless communication.

As shown in FIG. 15, at 1502, the network entity may receive an SRS from a first number of SRS ports of a UE and sequentially mapped over a second number of OFDM symbols. The second number may be greater than one. The UE may be the UE 104, 350, 1102, or the apparatus 1604 in the hardware implementation of FIG. 16. FIGS. 5A, 5B, 6A, 6B, 7A, 7B, 8A, 8B, 9A, 9B, 10A, 10B, and 11 illustrate various aspects of the steps in connection with flowchart 1500. For example, referring to FIG. 11, the network entity (base station 1104) may receive, at 1108, an SRS from a first number of SRS ports of a UE 1102 and sequentially mapped over a second number of OFDM symbols. In one example, referring to FIG. 6A, eight SRS ports (SRS ports 1000-1007) may be mapped to four OFDM symbols (S1-S4). In another example, referring to FIG. 7B, eight SRS ports (SRS ports 1000-1007) may be mapped to eight OFDM symbols (S1-S8). In some aspects, 1502 may be performed by the SRS reception component 199.

At 1504, the network entity may receive a PUSCH transmission based on the SRS. For example, referring to FIG. 11, the network entity (base station 1104) may receive, at 1120, a PUSCH transmission based on the SRS (received at 1108). In some aspects, 1504 may be performed by the SRS reception component 199.

In some aspects, the SRS may be for a codebook-based PUSCH, and a first subset of the SRS ports are coherent and a second subset of the SRS ports may be coherent. The first subset of the SRS ports may be incoherent with the second subset of the SRS ports. For example, referring to FIG. 6A, the first subset of the SRS ports (SRS ports 1000-1003) may be coherent and the second subset of the SRS ports (SRS ports 1004-1007) may be coherent. The first subset of the SRS ports (SRS ports 1000-1003) may be incoherent with the second subset of the SRS ports (SRS ports 1004-1007).

In some aspects, at 1512, the first subset of SRS ports may be mapped to a first contiguous subset of the OFDM symbols, and the second subset of SRS ports may be mapped to a second contiguous subset of the OFDM symbols. For example, referring to FIG. 6A, the first subset of SRS ports (SRS ports 1000-1003) may be mapped to a first contiguous subset of the OFDM symbols (S1, S2), and the second subset of the SRS ports (SRS ports 1004-1007) to a second contiguous subset of the OFDM symbols (S3, S4).

In some aspects, the first contiguous subset of the OFDM symbols may be contiguous or non-contiguous with the second contiguous subset of the OFDM symbols. For example, referring to FIG. 6A, the first contiguous subset of the OFDM symbols may be OFDM symbols S1 and S2, and the second contiguous subset of the OFDM symbols may be OFDM symbols S3 and S4. The first contiguous subset of the OFDM symbols (S1 and S2) may be contiguous or non-contiguous with the second contiguous subset of the OFDM symbols (S3 and S4).

In some aspects, at 1514, the first number of SRS ports may be mapped to the second number of OFDM symbols within the same slot or sub-slot based on the first number of SRS ports being a coherent SRS port group. For example, referring to FIG. 6B, the first number of SRS ports (SRS ports 1000-1003) may be mapped to the second number of OFDM symbols (S1 and S2) within the same slot or sub-slot based on the first number of SRS ports being a coherent SRS port group.

In some aspects, at 1516, non-coherent SRS ports may be mapped to the second number of OFDM symbols in different slots or different sub-slots. For example, referring to FIG. 6B, SRS ports 1002 and 1003 may be mapped to OFDM symbol S2, and SRS ports 1004 and 1005 may be mapped to OFDM symbol S3. If SRS ports 1002 and 1003 are non-coherent with SRS ports 1004 and 1005, OFDM symbols S2 and S3 may be in different slots or sub-slots.

In some aspects, at 1518, the usage of the first number of SRS ports may be for codebook-based physical uplink shared channel (PUSCH), and codebooks for the first number of the SRS ports may be for an antenna switching scheme. At 1520, the first number of SRS ports may be sequentially mapped to the second number of OFDM symbols in contiguous or non-contiguous symbols based on the antenna switching scheme. For example, referring to FIG. 5A, eight SRS ports (SRS ports 1000-1007) may be mapped to two OFDM symbols (S1 and S2). If the usage of the eight SRS ports (SRS ports 1000-1007) is for codebook-based PUSCH, and codebooks for the eight SRS ports (SRS ports 1000-1007) is for an antenna switching scheme, two OFDM symbols (S1 and S2) may be contiguous or non-contiguous symbols.

In some aspects, at 1518, the usage of the first number of SRS ports may be for codebook-based PUSCH, and codebooks for the first number of the SRS ports may be for an antenna switching scheme. At 1522, the first number of SRS ports may be sequentially mapped to the second number of OFDM symbols in the same slot, the same sub-slot, different slots, or different sub-slots based on the antenna switching scheme. For example, referring to FIG. 5A, eight SRS ports (SRS ports 1000-1007) may be mapped to two OFDM symbols (S1 and S2). If the usage of the eight SRS ports (SRS ports 1000-1007) is for codebook-based PUSCH, and codebooks for the eight SRS ports (SRS ports 1000-1007) is for an antenna switching scheme, two OFDM symbols (S1 and S2) may be in the same slot, the same sub-slot, different slots, or different sub-slots.

In some aspects, at 1524, the first number of SRS ports may be each mapped to a subset of the second number of OFDM symbols, the subset of the second number of OFDM symbols being based on the second number of OFDM symbols divided by a repetition factor. In some examples, the mapping from the first number of SRS ports to the subset of the second number of OFDM symbols may be repeated on the second number of OFDM symbols by a time specified by the repetition factor. For example, referring to FIG. 7A, when sequentially mapping the first number (i.e., 8) of SRS ports (SRS ports 1000-1007) to the second number (i.e., 8) of OFDM symbols (S1-S8), assuming a repetition factor of 2, the first number (i.e., 8) of SRS ports (SRS ports 1000-1007) may first be mapped to a subset of the second number of symbols (i.e., symbols S1-S4). The subset of the second number of symbols may be based on the second number of symbols (i.e., 8) divided by a repetition factor (i.e., 2). The mapping from the first number of SRS ports (SRS ports 1000-1007) to the subset of the second number of OFDM symbols may be repeated on the second number of OFDM symbols by a time specified by the repetition factor (e.g., 2 times).

In some aspects, at 1526, a subset of the first number of SRS ports may be mapped to a single symbol, and the subset is based on a repetition factor. For example, referring to FIG. 7B, when sequentially mapping eight SRS ports (SRS ports 1000-1007) to eight OFDM symbols (S1-S8), assuming a repetition factor of 2, a subset of the first number of SRS ports (SRS ports 1000-1001) may be first mapped to a single symbol (S1). The subset (i.e., 2 SRS ports) may be based on the repetition factor (i.e., 2).

In some aspects, the PUSCH may be associated with the most recent SRS resource indicated by an SRI that does not include a skipped transmission of at least one SRS port of the first number of SRS ports. For example, referring to FIG. 9A, the PUSCH transmission (at slot n+1) may be associated SRS resource 1 transmission at slot n−4. SRS resource 1 is indicated by an SRI at slot n, and slot n−4 is the most recent SRS resource 1 transmission that does not include a skipped transmission of at least one SRS port of the first number of SRS ports (SRS ports 0-7).

In some aspects, the association of the SRS with the PUSCH transmission may be based on whether at least a part of an SRS transmission has been dropped and based on one or more of an SRS usage, a codebook, or a coherency. For example, referring to FIG. 9B, the association of the SRS with the PUSCH transmission may be based on whether at least a part of an SRS transmission has been dropped (e.g., whether ports 4-7 has been dropped) and based on whether the SRS usage is for codebook-based 8 Tx PUSCH, and a coherency of the codebook/precoder.

Figure 16:
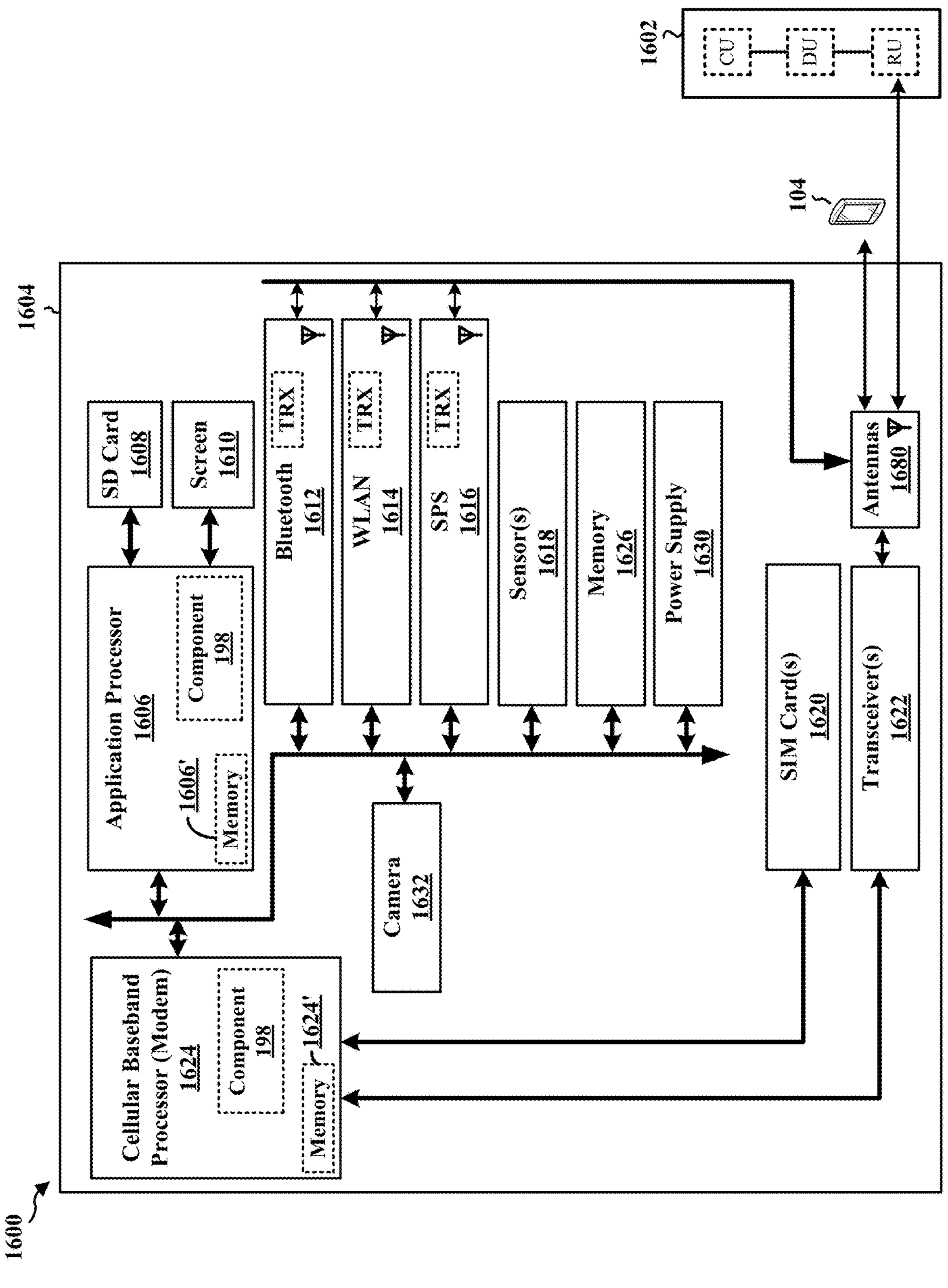
FIG. 16 is a diagram illustrating an example of a hardware implementation for an example apparatus and/or network entity.

FIG. 16 is a diagram 1600 illustrating an example of a hardware implementation for an apparatus 1604. The apparatus 1604 may be a UE, a component of a UE, or may implement UE functionality. In some aspects, the apparatus 1604 may include at least one cellular baseband processor (or processing circuitry) 1624 (also referred to as a modem) coupled to one or more transceivers 1622 (e.g., cellular RF transceiver). The cellular baseband processor(s) (or processing circuitry) 1624 may include at least one on-chip memory (or memory circuitry) 1624'. In some aspects, the apparatus 1604 may further include one or more subscriber identity modules (SIM) cards 1620 and at least one application processor (or processing circuitry) 1606 coupled to a secure digital (SD) card 1608 and a screen 1610. The application processor(s) (or processing circuitry) 1606 may include on-chip memory (or memory circuitry) 1606'. In some aspects, the apparatus 1604 may further include a Bluetooth module 1612, a WLAN module 1614, an SPS module 1616 (e.g., GNSS module), one or more sensor modules 1618 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1626, a power supply 1630, and/or a camera 1632. The Bluetooth module 1612, the WLAN module 1614, and the SPS module 1616 may include an on-chip transceiver (TRX) (or in some cases, just a receiver (RX)). The Bluetooth module 1612, the WLAN module 1614, and the SPS module 1616 may include their own dedicated antennas and/or utilize the antennas 1680 for communication. The cellular baseband processor(s) (or processing circuitry) 1624 communicates through the transceiver(s) 1622 via one or more antennas 1680 with the UE 104 and/or with an RU associated with a network entity 1602. The cellular baseband processor(s) (or processing circuitry) 1624 and the application processor(s) (or processing circuitry) 1606 may each include a computer-readable medium/memory (or memory circuitry) 1624', 1606', respectively. The additional memory modules 1626 may also be considered a computer-readable medium/memory (or memory circuitry). Each computer-readable medium/memory (or memory circuitry) 1624', 1606', 1626 may be non-transitory. The cellular baseband processor(s) (or processing circuitry) 1624 and the application processor(s) (or processing circuitry) 1606 are each responsible for general processing, including the execution of software stored on the computer-readable medium/memory (or memory circuitry). The software, when executed by the cellular baseband processor(s) (or processing circuitry) 1624/application processor(s) (or processing circuitry) 1606, causes the cellular baseband processor(s) (or processing circuitry) 1624/application processor(s) (or processing circuitry) 1606 to perform the various functions described supra. The cellular baseband processor(s) (or processing circuitry) 1624 and the application processor(s) (or processing circuitry) 1606 are configured to perform the various functions described supra based at least in part of the information stored in the memory (or memory circuitry). That is, the cellular baseband processor(s) (or processing circuitry) 1624 and the application processor(s) (or processing circuitry) 1606 may be configured to perform a first subset of the various functions described supra without information stored in the memory and may be configured to perform a second subset of the various functions described supra based on the information stored in the memory. The computer-readable medium/memory (or memory circuitry) may also be used for storing data that is manipulated by the cellular baseband processor(s) (or processing circuitry) 1624/application processor(s) (or processing circuitry) 1606 when executing software. The cellular baseband processor(s) (or processing circuitry) 1624/application processor(s) (or processing circuitry) 1606 may be a component of the UE 350 and may include the at least one memory 360 and/or at least one of the TX processor 368, the RX processor 356, and the controller/processor 359. In one configuration, the apparatus 1604 may be at least one processor chip (modem and/or application) and include just the cellular baseband processor(s) (or processing circuitry) 1624 and/or the application processor(s) (or processing circuitry) 1606, and in another configuration, the apparatus 1604 may be the entire UE (e.g., see UE 350 of FIG. 3) and include the additional modules of the apparatus 1604.

As discussed supra, the component 198 may be configured to sequentially map a first number of SRS ports to a second number of OFDM symbols. The first number and the second number may each be greater than one. The component 198 may be further configured to transmit an SRS from the first number of SRS ports over the second number of OFDM symbols based on the mapping. The component 198 may be further configured to perform any of the aspects described in connection with the flowcharts in FIG. 12 and FIG. 13, and/or performed by the UE 1102 in FIG. 11. The component 198 may be within the cellular baseband processor 1624, the application processor 1606, or both the cellular baseband processor 1624 and the application processor 1606. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1604 may include a variety of components configured for various functions. In one configuration, the apparatus 1604, and in particular the cellular baseband processor 1624 and/or the application processor 1606, includes means for sequentially mapping a first number of SRS ports to a second number of OFDM symbols, the first number and the second number each being greater than one, and means for transmitting an SRS from the first number of SRS ports over the second number of OFDM symbols based on the mapping. The apparatus 1604 may further include means for performing any of the aspects described in connection with the flowcharts in FIG. 12 and FIG. 13, and/or aspects performed by the UE 1102 in FIG. 11. The means may be the component 198 of the apparatus 1604 configured to perform the functions recited by the means. As described supra, the apparatus 1604 may include the TX processor 368, the RX processor 356, and the controller/processor 359. As such, in one configuration, the means may be the TX processor 368, the RX processor 356, and/or the controller/processor 359 configured to perform the functions recited by the means.

Figure 17:
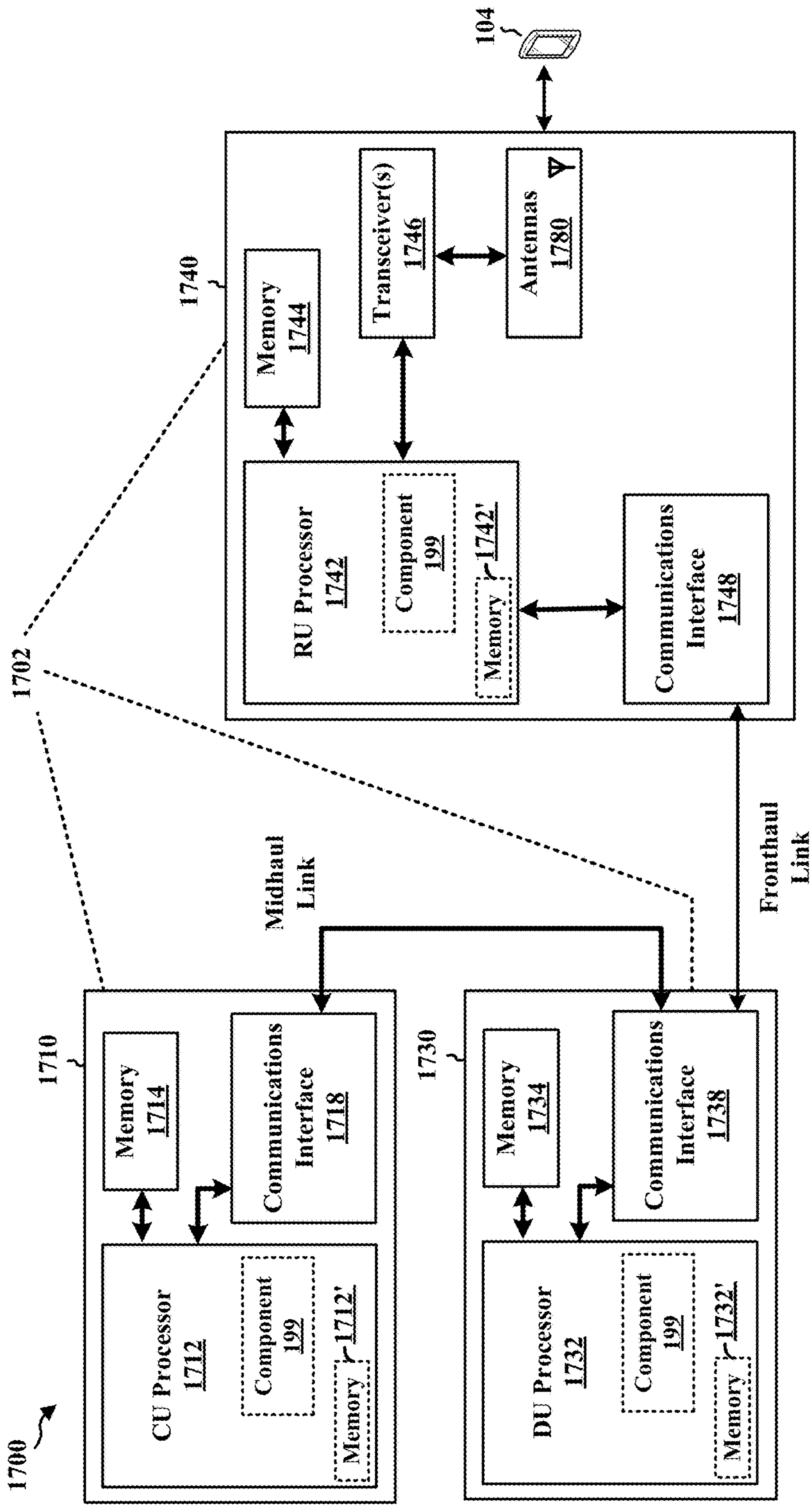
FIG. 17 is a diagram illustrating an example of a hardware implementation for an example network entity.

FIG. 17 is a diagram 1700 illustrating an example of a hardware implementation for a network entity 1702. The network entity 1702 may be a BS, a component of a BS, or may implement BS functionality. The network entity 1702 may include at least one of a CU 1710, a DU 1730, or an RU 1740. For example, depending on the layer functionality handled by the component 199, the network entity 1702 may include the CU 1710; both the CU 1710 and the DU 1730; each of the CU 1710, the DU 1730, and the RU 1740; the DU 1730; both the DU 1730 and the RU 1740; or the RU 1740. The CU 1710 may include at least one CU processor (or processing circuitry) 1712. The CU processor(s) (or processing circuitry) 1712 may include on-chip memory (or memory circuitry) 1712'. In some aspects, the CU 1710 may further include additional memory modules 1714 and a communications interface 1718. The CU 1710 communicates with the DU 1730 through a midhaul link, such as an F1 interface. The DU 1730 may include at least one DU processor (or processing circuitry) 1732. The DU processor(s) (or processing circuitry) 1732 may include on-chip memory (or memory circuitry) 1732'. In some aspects, the DU 1730 may further include additional memory modules 1734 and a communications interface 1738. The DU 1730 communicates with the RU 1740 through a fronthaul link. The RU 1740 may include at least one RU processor (or processing circuitry) 1742. The RU processor(s) (or processing circuitry) 1742 may include on-chip memory (or memory circuitry) 1742'. In some aspects, the RU 1740 may further include additional memory modules 1744, one or more transceivers 1746, antennas 1780, and a communications interface 1748. The RU 1740 communicates with the UE 104. The on-chip memory (or memory circuitry) 1712', 1732', 1742' and the additional memory modules 1714, 1734, 1744 may each be considered a computer-readable medium/memory (or memory circuitry). Each computer-readable medium/memory (or memory circuitry) may be non-transitory. Each of the processors (or processing circuitry) 1712, 1732, 1742 is responsible for general processing, including the execution of software stored on the computer-readable medium/memory (or memory circuitry). The software, when executed by the corresponding processor(s) (or processing circuitry) causes the processor(s) (or processing circuitry) to perform the various functions described supra. The computer-readable medium/memory (or memory circuitry) may also be used for storing data that is manipulated by the processor(s) (or processing circuitry) when executing software.

As discussed supra, the component 199 may be configured to receive an SRS from a first number of SRS ports of a UE and sequentially mapped over a second number of orthogonal frequency-division multiplexing (OFDM) symbols, the second number being greater than one; and receive a PUSCH transmission based on the SRS. The component 199 may be further configured to perform any of the aspects described in connection with the flowcharts in FIG. 14 and FIG. 15, and/or performed by the base station 1104 in FIG. 11. The component 199 may be within one or more processors of one or more of the CU 1710, DU 1730, and the RU 1740. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1702 may include a variety of components configured for various functions. In one configuration, the network entity 1702 includes means for receiving an SRS from a first number of SRS ports of a UE and sequentially mapped over a second number of OFDM symbols, the second number being greater than one, and means for receiving a PUSCH transmission based on the SRS. The network entity 1702 may further include means for performing any of the aspects described in connection with the flowcharts in FIG. 14 and FIG. 15, and/or aspects performed by the base station 1104 in FIG. 11. The means may be the component 199 of the network entity 1702 configured to perform the functions recited by the means. As described supra, the network entity 1702 may include the TX processor 316, the RX processor 370, and the controller/processor 375. As such, in one configuration, the means may be the TX processor 316, the RX processor 370, and/or the controller/processor 375 configured to perform the functions recited by the means.

This disclosure provides a method for wireless communication at a UE. The method may include sequentially mapping a first number of SRS ports to a second number of OFDM symbols, the first number and the second number each being greater than one; and transmitting an SRS from the first number of SRS ports over the second number of OFDM symbols based on the mapping. The method enables or enhances 8 Tx UL operation to support four and more layers per UE in UL targeting devices. Thus, the aspects presented herein improve the efficiency of wireless communication.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X. X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. A processor may be referred to as processor circuitry. A memory/memory module may be referred to as memory circuitry. If a first apparatus receives data from or transmits data to a second apparatus, the data may be received/transmitted directly between the first and second apparatuses, or indirectly between the first and second apparatuses through a set of apparatuses. A device configured to "output" data or "provide" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE. The method may include sequentially mapping a first number of SRS ports to a second number of OFDM symbols, where the first number and the second number each being greater than one; and transmitting an SRS from the first number of SRS ports over the second number of OFDM symbols based on the mapping.

Aspect 2 is the method of aspect 1, where the SRS ports may be based on a codebook, the first subset of the SRS ports may be coherent and the second subset of the SRS ports may be coherent, and the first subset of the SRS ports may be incoherent with the second subset of the SRS ports.

Aspect 3 is the method of any of aspects 1 to 2, where sequentially mapping the first number of SRS ports to the second number of OFDM symbols may include: mapping the first subset of SRS ports to a first contiguous subset of the OFDM symbols; and mapping the second subset of the SRS ports to a second contiguous subset of the OFDM symbols.

Aspect 4 is the method of aspect 3, where the first contiguous subset of the OFDM symbols may be contiguous or non-contiguous with the second contiguous subset of the OFDM symbols.

Aspect 5 is the method of any of aspects 1 to 2, where the first number of SRS ports may be mapped to the second number of OFDM symbols within a same slot or sub-slot based on the first number of SRS ports being a coherent SRS port group.

Aspect 6 is the method of any of aspects 1 to 2, where sequentially mapping the first number of SRS ports to the second number of OFDM symbols may further include: mapping non-coherent SRS port groups in the first number of SRS ports to different slots or sub-slots.

Aspect 7 is the method of any of aspects 1 to 2, where a usage of the first number of SRS ports may be for codebook-based PUSCH, and codebooks for the first number of the SRS ports may be for an antenna switching scheme, where sequentially mapping the first number of SRS ports to the second number of OFDM symbols may include: mapping the first number of SRS ports to contiguous or non-contiguous symbols based on the antenna switching scheme.

Aspect 8 is the method of any of aspects 1 to 2, where a usage of the first number of SRS ports may be for codebook-based PUSCH, and codebooks for the first number of the SRS ports are for an antenna switching scheme, where sequentially mapping the first number of SRS ports to the second number of OFDM symbols may include: mapping the first number of SRS ports to a same slot, a same sub-slot, different slots, or different sub-slots based on the antenna switching scheme.

Aspect 9 is the method of any of aspects 1 to 2, where the sequentially mapping may include mapping the first number of SRS ports to a subset of the second number of symbols. The subset of the second number of symbols may be based on the second number of symbols divided by a repetition factor. The mapping from the first number of SRS ports to the subset of the second number of symbols may be repeated on the second number of symbols by a time specified by the repetition factor.

Aspect 10 is the method of any of aspects 1 to 2, where the sequentially mapping may include mapping a subset of the first number of SRS ports to a single symbol. The subset may be based on a repetition factor.

Aspect 11 is the method of any of aspects 1 to 10, where the method may further include associating a PUSCH transmission with a most recent transmission of an SRS resource indicated by an SRI that does not include a skipped transmission of at least one SRS port of the first number of SRS ports.

Aspect 12 is the method of any of aspects 1 to 10, where the method may further include determining whether to use a partial SRS transmission for a PUSCH transmission based on one or more of SRS usage, a codebook, or a coherency.

Aspect 13 is the method of aspect 12, where the SRS usage of the first number of SRS ports may be for a codebook-based PUSCH, and the first number of SRS ports may include a third number of SRS ports having codebooks that are coherent, and the method may further include: in response to a drop of at least one SRS port of the first number of SRS ports in communication with a network entity, dropping all the first number of SRS ports.

Aspect 14 is the method of aspect 12, where the usage of the first number of SRS ports may be for codebook-based PUSCH, and the first number of SRS ports may include a fourth number of SRS ports having codebooks that are non-coherent, and the method may further include: in response to a drop of at least one SRS port of the fourth number of SRS ports in communication with a network entity, continuing the communication with the network entity with the SRS ports that have not been dropped.

Aspect 15 is the method of any of aspects 1 to 10, where an SRS usage of the first number of SRS ports may be for codebook-based PUSCH, and codebooks for the first number of the SRS ports may be for an antenna switching scheme, and the method may further include: in response to a drop of at least one SRS port of the first number of SRS ports in communication with a network entity, continuing the communication with the network entity with the SRS ports that have not been dropped.

Aspect 16 is an apparatus for wireless communication at a UE, comprising: a processing system that includes processor circuitry and memory circuitry that stores code and is coupled with the processor circuitry, the processing system configured to cause the UE to perform the method of one or more of aspects 1-15.

Aspect 17 is an apparatus for wireless communication at a UE, comprising: at least one memory; and at least one processor coupled to the at least one memory and, where the at least one processor, individually or in any combination, is configured to perform the method of any of aspects 1-15.

Aspect 18 is the apparatus for wireless communication at the UE, comprising means for performing each step in the method of any of aspects 1-15.

Aspect 19 is the apparatus of any of aspects 16-18, further comprising a transceiver configured to receive or to transmit in association with the method of any of aspects 1-15.

Aspect 20 is a computer-readable medium (e.g., a non-transitory computer-readable medium) storing computer executable code at a UE, the code when executed by at least one processor causes the at least one processor to, individually or in any combination, perform the method of any of aspects 1-15.

Aspect 21 is a method of wireless communication at a network entity. The method may include receiving an SRS from a first number of SRS ports of a UE and sequentially mapped over a second number of OFDM symbols, where the second number is greater than one; and receiving a PUSCH transmission based on the SRS.

Aspect 22 is the method of aspect 21, where the SRS may be for a codebook-based PUSCH, and a first subset of the SRS ports are coherent and a second subset of the SRS ports are coherent. The first subset of the SRS ports may be incoherent with the second subset of the SRS ports.

Aspect 23 is the method of aspect 22, where the first subset of SRS ports may be mapped to a first contiguous subset of the OFDM symbols, and the second subset of SRS ports may be mapped to a second contiguous subset of the OFDM symbols.

Aspect 24 is the method of aspect 23, where the first contiguous subset of the OFDM symbols may be contiguous or non-contiguous with the second contiguous subset of the OFDM symbols.

Aspect 25 is the method of aspect 21, where the first number of SRS ports may be mapped to the second number of OFDM symbols within a same slot or sub-slot based on the first number of SRS ports being a coherent SRS port group.

Aspect 26 is the method of any of aspects 21 to 25, where non-coherent SRS ports may be mapped to the second number of OFDM symbols in different slots or different sub-slots.

Aspect 27 is the method of any of aspects 21 to 26, where the usage of the first number of SRS ports may be for codebook-based PUSCH, and codebooks for the first number of the SRS ports may be for an antenna switching scheme. The first number of SRS ports may be sequentially mapped to the second number of OFDM symbols in contiguous or non-contiguous symbols based on the antenna switching scheme.

Aspect 28 is the method of any of aspects 21 to 26, where the usage of the first number of SRS ports may be for codebook-based PUSCH, and codebooks for the first number of the SRS ports may be for an antenna switching scheme. The first number of SRS ports may be sequentially mapped to the second number of OFDM symbols in a same slot, a same sub-slot, different slots, or different sub-slots based on the antenna switching scheme.

Aspect 29 is the method of any of aspects 21 to 28, where the first number of SRS ports may be each mapped to a subset of the second number of symbols. The subset of the second number of symbols may be based on the second number of symbols divided by a repetition factor. The mapping from the first number of SRS ports to the subset of the second number of symbols may be repeated on the second number of symbols by a time specified by the repetition factor.

Aspect 30 is the method of any of aspects 21 to 28, where a subset of the first number of SRS ports may be mapped to a single symbol, and the subset may be based on a repetition factor.

Aspect 31 is the method of any of aspects 21 to 28, where the PUSCH may be associated with a most recent SRS resource indicated by an SRI that does not include a skipped transmission of at least one SRS port of the first number of SRS ports.

Aspect 32 is the method of any of aspects 21 to 28, where the association of the SRS with the PUSCH transmission may be based on whether at least a part of an SRS transmission has been dropped and based on one or more of an SRS usage, a codebook, or a coherency.

Aspect 33 is an apparatus for wireless communication at a network entity, comprising: a processing system that includes processor circuitry and memory circuitry that stores code and is coupled with the processor circuitry, the processing system configured to cause the network entity to perform the method of one or more of aspects 21-32.

Aspect 34 is an apparatus for wireless communication at a network entity, comprising: at least one memory; and at least one processor coupled to the at least one memory and, where the at least one processor, individually or in any combination, is configured to perform the method of any of aspects 21-32.

Aspect 35 is an apparatus for wireless communication at a network entity, comprising means for performing each step in the method of any of aspects 21-32.

Aspect 36 is the apparatus of any of aspects 33-35, further comprising a transceiver configured to receive or to transmit in association with the method of any of aspects 21-32.

Aspect 37 is a computer-readable medium (e.g., a non-transitory computer-readable medium) storing computer executable code at a network entity, the code when executed by at least one processor causes the at least one processor to, individually or in any combination, perform the method of any of aspects 21-32.

What is claimed is:

1. An apparatus for wireless communication at a user equipment (UE), comprising:

at least one memory; and at least one processor coupled to the at least one memory and, based at least in part on information stored in the at least one memory, the at least one processor is configured to cause the UE to:

sequentially map, based on a repetition factor, a first number of Sounding Reference Signal (SRS) ports to a second number of orthogonal frequency-division multiplexing (OFDM) symbols, the first number and the second number each being greater than one, wherein for each OFDM symbol of the second number of OFDM symbols, a respective subset of SRS ports of the first number of SRS ports is mapped to the OFDM symbol, wherein a number of SRS ports in the respective subset of SRS ports is less than the first number and is based on the repetition factor; and transmit an SRS from the first number of SRS ports over the second number of OFDM symbols.

2. The apparatus of claim 1, further comprising a transceiver coupled to the at least one processor, wherein, to transmit the SRS, the at least one processor is configured to cause the UE to transmit the SRS via the transceiver, and wherein the SRS ports is based on a codebook, wherein a first subset of the SRS ports are coherent and a second subset of the SRS ports are coherent, the first subset of the SRS ports being incoherent with the second subset of the SRS ports.

3. The apparatus of claim 2, wherein, to sequentially map the first number of SRS ports to the second number of OFDM symbols, the at least one processor is configured to cause the UE to:

map the first subset of the SRS ports to a first contiguous subset of the OFDM symbols; and map the second subset of the SRS ports to a second contiguous subset of the OFDM symbols.

4. The apparatus of claim 3, wherein the first contiguous subset of the OFDM symbols is contiguous or non-contiguous with the second contiguous subset of the OFDM symbols.

5. The apparatus of claim 2, wherein the first number of SRS ports are mapped to the second number of OFDM symbols within a same slot or sub-slot based on the first number of SRS ports being a coherent SRS port group.

6. The apparatus of claim 1, wherein, to sequentially map the first number of SRS ports to the second number of OFDM symbols, the at least one processor is further configured to cause the UE to:

map non-coherent SRS port groups in the first number of SRS ports to different slots or sub-slots.

7. The apparatus of claim 1, wherein a usage of the first number of SRS ports is for codebook-based physical uplink shared channel (PUSCH), and codebooks for the first number of SRS ports are for an antenna switching scheme, wherein, to sequentially map the first number of SRS ports to the second number of OFDM symbols, the at least one processor is configured to cause the UE to:

map the first number of SRS ports to contiguous or non-contiguous symbols based on the antenna switching scheme.

8. The apparatus of claim 1, wherein a usage of the first number of SRS ports is for codebook-based physical uplink shared channel (PUSCH), and codebooks for the first number of SRS ports are for an antenna switching scheme, wherein, to sequentially map the first number of SRS ports to the second number of OFDM symbols, the at least one processor is configured to cause the UE to:

map the first number of SRS ports to a same slot, a same sub-slot, different slots, or different sub-slots based on the antenna switching scheme.

9. The apparatus of claim 1, wherein, to sequentially map the first number of SRS ports to the second number of OFDM symbols, the at least one processor is configured to cause the UE to:

map the first number of SRS ports to a subset of the second number of symbols, the subset of the second number of symbols being based on the second number of symbols divided by the repetition factor, wherein a mapping from the first number of SRS ports to the subset of the second number of symbols is repeated on the second number of symbols by a time specified by the repetition factor.

10. The apparatus of claim 1, wherein, to sequentially map the first number of SRS ports to the second number of OFDM symbols, the at least one processor is configured to cause the UE to:

map a subset of the first number of SRS ports to a single symbol, the subset being based on the repetition factor.

11. The apparatus of claim 1, wherein the at least one processor is further configured to cause the UE to:

associate a physical uplink shared channel (PUSCH) transmission with a most recent transmission of an SRS resource indicated by an SRS resource indicator (SRI) that does not include a skipped transmission of at least one SRS port of the first number of SRS ports.

12. The apparatus of claim 1, wherein the at least one processor is further configured to cause the UE to:

determine whether to use a partial SRS transmission for a physical uplink shared channel (PUSCH) transmission based on one or more of SRS usage, a codebook, or a coherency.

13. The apparatus of claim 12, wherein the SRS usage of the first number of SRS ports is for a codebook-based PUSCH, and the first number of SRS ports include a third number of SRS ports having codebooks that are coherent, and the at least one processor is further configured to cause the UE to:

in response to a drop of at least one SRS port of the first number of SRS ports in communication with a network entity, drop all the first number of SRS ports.

14. The apparatus of claim 12, wherein a usage of the first number of SRS ports is for codebook-based physical uplink shared channel (PUSCH), and the first number of SRS ports include a fourth number of SRS ports having codebooks that are non-coherent, and the at least one processor is further configured to cause the UE to:

in response to a drop of at least one SRS port of the fourth number of SRS ports in communication with a network entity, continue the communication with the network entity with the SRS ports that have not been dropped.

15. The apparatus of claim 1, wherein an SRS usage of the first number of SRS ports is for codebook-based physical uplink shared channel (PUSCH), and codebooks for the first number of SRS ports are for an antenna switching scheme, and wherein the at least one processor is further configured to cause the UE to:

in response to a drop of at least one SRS port of the first number of SRS ports in communication with a network entity, continue the communication with the network entity with the SRS ports that have not been dropped.

16. An apparatus for wireless communication at a network entity, comprising:

at least one memory; and at least one processor coupled to the at least one memory and, based at least in part on information stored in the at least one memory, the at least one processor is configured to cause the network entity to:

receive a sounding reference signal (SRS) from a first number of SRS ports of a user equipment (UE), wherein the first number of SRS ports of the UE are sequentially mapped over a second number of orthogonal frequency-division multiplexing (OFDM) symbols based on a repetition factor, wherein the second number is greater than one, wherein for each OFDM symbol of the second number of OFDM symbols, a respective subset of SRS ports of the first number of SRS ports is mapped to the OFDM symbol, wherein a number of SRS ports in the respective subset of SRS ports is less than the first number and is based on the repetition factor;

transmit, to the UE, downlink control information (DCI) comprising an SRS resource indicator (SRI); and receive a physical uplink shared channel (PUSCH) transmission based on the SRS, wherein the PUSCH transmission is associated with the SRI.

17. The apparatus of claim 16, further comprising a transceiver coupled to the at least one processor, wherein, to receive the SRS, the at least one processor is configured to cause the network entity to receive the SRS via the transceiver, and wherein the SRS is for a codebook-based PUSCH, and a first subset of the SRS ports are coherent and a second subset of the SRS ports are coherent, the first subset of the SRS ports being incoherent with the second subset of the SRS ports.

18. The apparatus of claim 17, wherein the first subset of the SRS ports are mapped to a first contiguous subset of the OFDM symbols, and the second subset of the SRS ports are mapped to a second contiguous subset of the OFDM symbols.

19. The apparatus of claim 18, wherein the first contiguous subset of the OFDM symbols is contiguous or non-contiguous with the second subset of the OFDM symbols.

20. The apparatus of claim 16, wherein the first number of SRS ports are mapped to the second number of OFDM symbols within a same slot or sub-slot based on the first number of SRS ports being a coherent SRS port group.

21. The apparatus of claim 16, wherein non-coherent SRS ports are mapped to the second number of OFDM symbols in different slots or different sub-slots.

22. The apparatus of claim 16, wherein a usage of the first number of SRS ports is for codebook-based physical uplink shared channel (PUSCH), and codebooks for the first number of SRS ports are for an antenna switching scheme, wherein the first number of SRS ports are sequentially mapped to the second number of OFDM symbols in contiguous or non-contiguous symbols based on the antenna switching scheme.

23. The apparatus of claim 16, wherein a usage of the first number of SRS ports is for codebook-based physical uplink shared channel (PUSCH), and codebooks for the first number of SRS ports are for an antenna switching scheme, wherein the first number of SRS ports are sequentially mapped to the second number of OFDM symbols in a same slot, a same sub-slot, different slots, or different sub-slots based on the antenna switching scheme.

24. The apparatus of claim 16, wherein the first number of SRS ports are each mapped to a subset of the second number of OFDM symbols, the subset of the second number of OFDM symbols being based on the second number of OFDM symbols divided by the repetition factor, wherein a mapping from the first number of SRS ports to the subset of the second number of OFDM symbols is repeated on the second number of OFDM symbols by a time specified by the repetition factor.

25. The apparatus of claim 16, wherein a subset of the first number of SRS ports are mapped to a single symbol, and the subset is based on the repetition factor.

26. The apparatus of claim 16, wherein the PUSCH transmission is associated with a most recent SRS resource indicated by the SRI that does not include a skipped transmission of at least one SRS port of the first number of SRS ports.

27. The apparatus of claim 16, wherein an association of the SRS with the PUSCH transmission is based on whether at least a part of an SRS transmission has been dropped and based on one or more of an SRS usage, a codebook, or a coherency.

28. A method of wireless communication at a user equipment (UE), comprising:

sequentially mapping, based on a repetition factor, a first number of Sounding Reference Signal (SRS) ports to a second number of orthogonal frequency-division multiplexing (OFDM) symbols, the first number and the second number each being greater than one, wherein for each OFDM symbol of the second number of OFDM symbols, a respective subset of SRS ports of the first number of SRS ports is mapped to the OFDM symbol, wherein a number of SRS ports in the respective subset of SRS ports is less than the first number and is based on the repetition factor; and transmitting an SRS from the first number of SRS ports over the second number of OFDM symbols based on the mapping.

29. The method of claim 28, wherein the SRS ports is based on a codebook, wherein a first subset of the SRS ports are coherent and a second subset of the SRS ports are coherent, the first subset of the SRS ports being incoherent with the second subset of the SRS ports.

30. A method of wireless communication at a network entity, comprising:

receiving a sounding reference signal (SRS) from a first number of SRS ports of a user equipment (UE), wherein the first number of SRS ports of the UE are sequentially mapped over a second number of orthogonal frequency-division multiplexing (OFDM) symbols based on a repetition factor, wherein the second number is greater than one, wherein for each OFDM symbol of the second number of OFDM symbols, a respective subset of SRS ports of the first number of SRS ports is mapped to the OFDM symbol, wherein a number of SRS ports in the respective subset of SRS ports is less than the first number and is based on the repetition factor;

transmitting, to the UE, downlink control information (DCI) comprising an SRS resource indicator (SRI); and receiving a physical uplink shared channel (PUSCH) transmission based on the SRS, wherein the PUSCH transmission is associated with the SRI.

* * * * *